Figure 1:
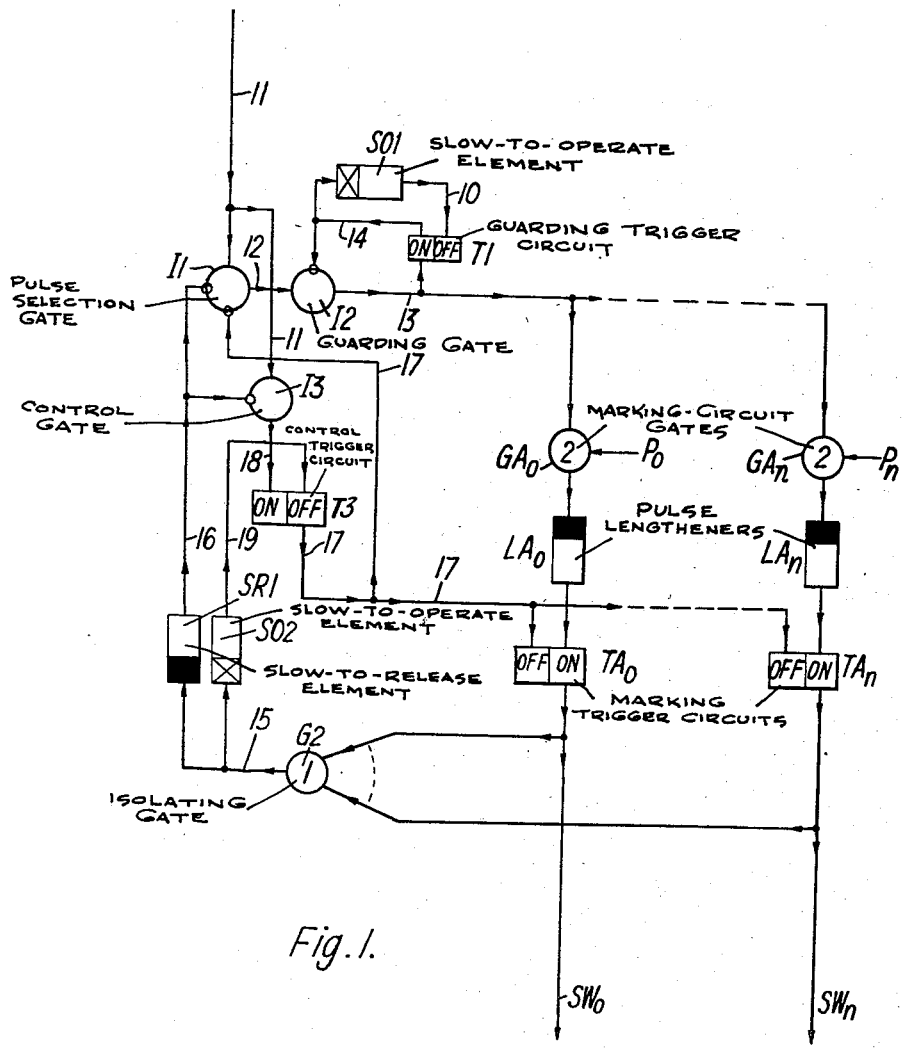

March 15, 1960     J. E. FLOOD ET AL     2,928,899

TIME DIVISION MULTIPLEX TRANSMISSION SYSTEMS

Filed May 9, 1955     16 Sheets-Sheet 1

Inventors
JOHN EDWARD FLOOD,
ALFRED GEORGE SIMMS,
By
Attorneys

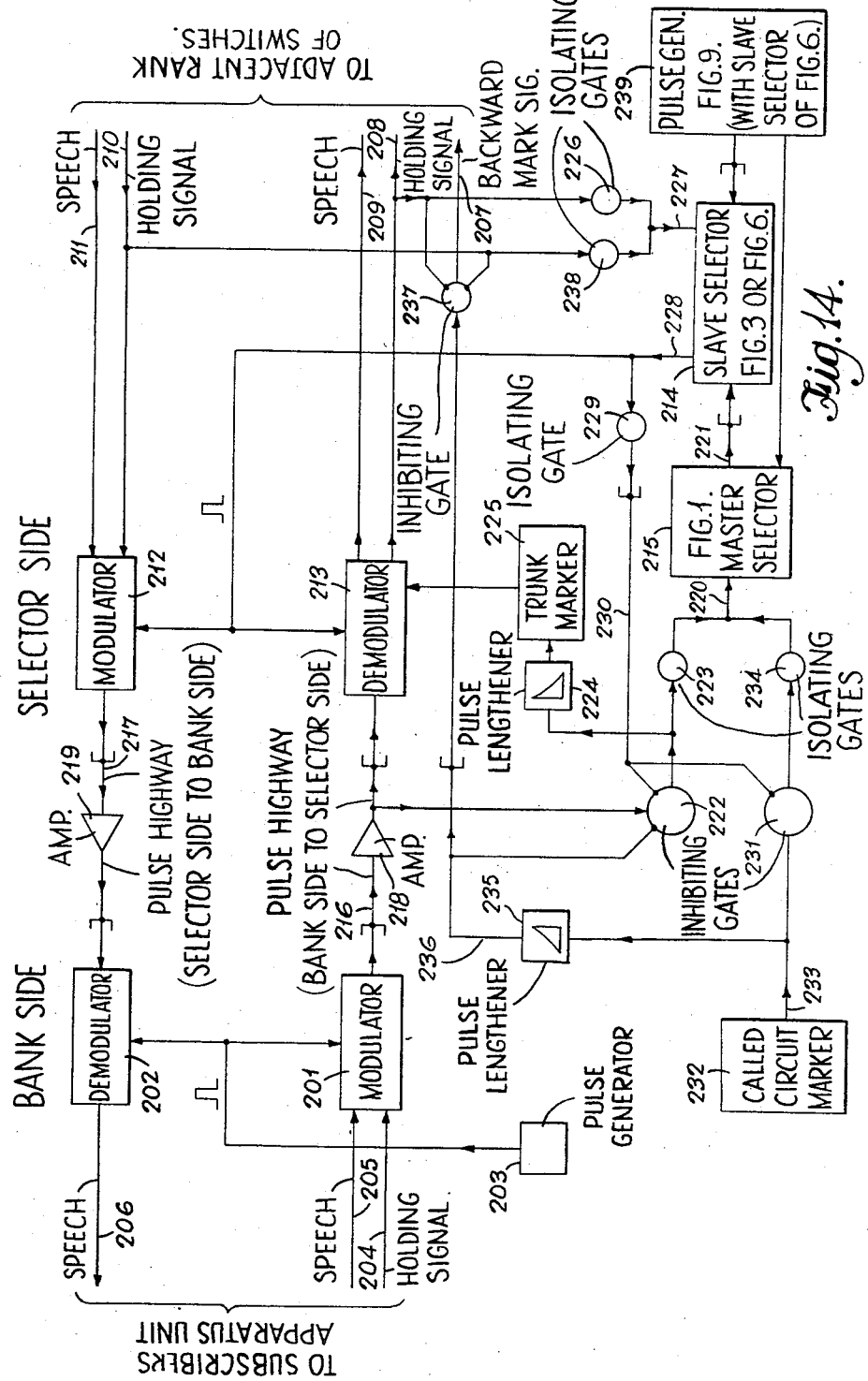

United States Patent Office 2,928,899
Patented Mar. 15, 1960

2,928,899

TIME DIVISION MULTIPLEX TRANSMISSION SYSTEMS

John Edward Flood, Herne Hill, London, and Alfred George Simms, Leicester, England, assignors, by mesne assignments, to Siemens Edison Swan Limited, London, England, a British company Application May 9, 1955, Serial No. 507,038

3 Claims. (Cl. 179—15)

This invention relates to transmission systems of the kind in which a number of time periods occurring successively in a time cycle form a corresponding number of separate communication channels. Such transmission systems are commonly referred to as time division multiplex transmission systems.

More specifically, the invention in its broadest aspects relates to time division multiplex transmission systems including control apparatus arranged to furnish regularly spaced pulses pertaining to any channel to which it is set, and/or including control apparatus arranged to furnish, on a group of connecting wires outgoing from it, a code signal condition pertaining to any channel to which it is set. Requirements for control apparatus as just referred to arise in connection with exchange (e.g. telephone exchange) switching systems of the kind in which connections through an exchange are set up by electronic switching means which function on a time division multiplex basis.

According to one main feature of the invention, in a time division multiplex transmission system including control apparatus arranged to furnish regularly spaced pulses pertaining to any channel to which this control apparatus is set, the said control apparatus has a single group of connecting wires incoming to it and is arranged to be set to any channel in response to the application to this group of wires of a code signal condition signifying the particular channel. The said control apparatus is linked to a pulse generator by a single group of pulse supply wires and includes, for each of the said connecting wires, a switching trigger circuit individual to, and arranged to be controlled over, the relevant connecting wire. The pulse generator is arranged to apply a different pulse code condition to the group of pulse supply wires for each channel time period in the time division multiplex cycle and to do this continuously cycle after cycle. In general, the application to the said group of connecting wires of a code signal condition signifying any particular channel brings about when requisite the setting of those switching trigger circuits which constitute a combination corresponding to the relevant channel, and as the result of such setting the condition arises that the pulse supply wires actively associated with an output circuit element of the said control apparatus are those which constitute a combination corresponding to the relevant channel. It is arranged that in general the said output circuit element furnishes an output pulse each time the pulse generator applies a pulse condition to all of the wires included in the combination of pulse supply wires actively associated with the output circuit element.

According to another main feature of the invention, in a time division multiplex transmission system including control apparatus arranged to furnish, on a single group of connecting wires outgoing from this control apparatus, a code signal condition pertaining to any channel to which this control apparatus is set, the said control apparatus includes a selection pulse highway and is arranged to be set to any channel in response to the appearance on this pulse highway of a pulse in a channel time period pertaining to the particular channel. The said control apparatus is linked to a pulse generator by a single group of pulse supply wires and includes, for each of the said connecting wires, a marking trigger circuit individual to, and serving when set to apply a signal condition to, the relevant connecting wire. The pulse generator is arranged to apply a different pulse code condition to the group of pulse supply wires for each channel time period in the time division multiplex cycles and to do this continuously cycle after cycle. Each marking trigger circuit is associated with a corresponding one of the pulse supply wires, and the arrangements for setting the said control apparatus are such that in general the appearance of a pulse on the said selection pulse highway serves to bring about the setting of each marking trigger circuit in respect of which the condition is satisfied that a pulse exists on the associated pulse supply wire coincidentally with the said pulse on the selection pulse highway.

An exchange switching system of the kind in which connections through an exchange are set up by electronic switching means which function on a time division multiplex basis may for instance be one in which a connection is set up through a switching rank by causing one of the switching means in the rank to function only during the time period allocated to the connection, each switching means having individual to it apparatus which can directly control its functioning in any time period of the time division multplex cycle, and common control apparatus adapted to be temporarily taken into use serving to determine which of the available time periods is to be used for the connection in question and to indicate this time period to the individual control apparatus. For convenience in description the common control apparatus will hereinafter be referred to as the master selector while the individual control apparatus will hereinafter be referred to as the slave selector. Pulse trains for use in the slave selector would in the arrangement just outlined be supplied from pulse generator equipment common to a number of slave selectors. The arrangements of the present invention find advantageous application to such slave selector and associated pulse generator equipment.

In the present invention the apparatus comprising the slave selector is adapted to be linked to the pulse generator equipment by one group of connecting wires and to the master selector apparatus by another group of connecting wires. In the slave selector itself a trigger circuit is associated with each connecting lead, or pair of connecting leads, from the pulse generator and each trigger circuit is adapted to be controlled over the connecting wires from the master selector. In addition the slave selector apparatus includes an output circuit element which functions to pass output pulses having the time period which the master selector indicates over the connecting leads to the slave selector apparatus.

An object of the present invention is to provide, for a telephone exchange switching system of the type described above, an economical slave selector arrangement in which the number of connecting leads in each group and the number of trigger circuit elements required within the slave selector itself is made small in comparison with the total number of communication channels which the time division multiplex system provides.

According to the present invention, the time periods in the time division multiplex cycle are defined on a multi-element code basis by causing the pulse generator apparatus to apply, for each time period in the cycle, a different pulse code condition to the group of leads by which it is connected to the slave selector apparatus, a particular time period being selected from the master selector by application of a particular code condition to the group of leads which connect the master selector apparatus to the slave selector apparatus thereby bringing about the functioning of those trigger circuit elements within the slave selector apparatus which correspond to the particular code, the output circuit element of the slave selector being arranged to pass an output pulse whose time position corresponds to that indicated by the pulse code applied to it from the said trigger circuits. In carrying out the invention, the multi-element pulse code conditions the pulse generator apparatus provides may be based on combinations of the connecting wires in the group, the pulses applied thereto being all of the same character, in which case a particular time period would be selected at the master selector by applying a momentary stimulus to a combination of its connecting wires corresponding to the code of the required time period. Alternatively, as regards the pulse generator, the multi-element pulse code conditions may involve all the connecting wires of the group, the character of the pulses, i.e. their duration, being varied to provide the different codes. In this case the group of connecting leads from the master selector would all be significant for each time period selection, the actual selection depending on the presence or absence of stimulus on each of the leads of the group, and may in fact be the complete absence of stimulus on any of the leads of the group.

Figure 2:
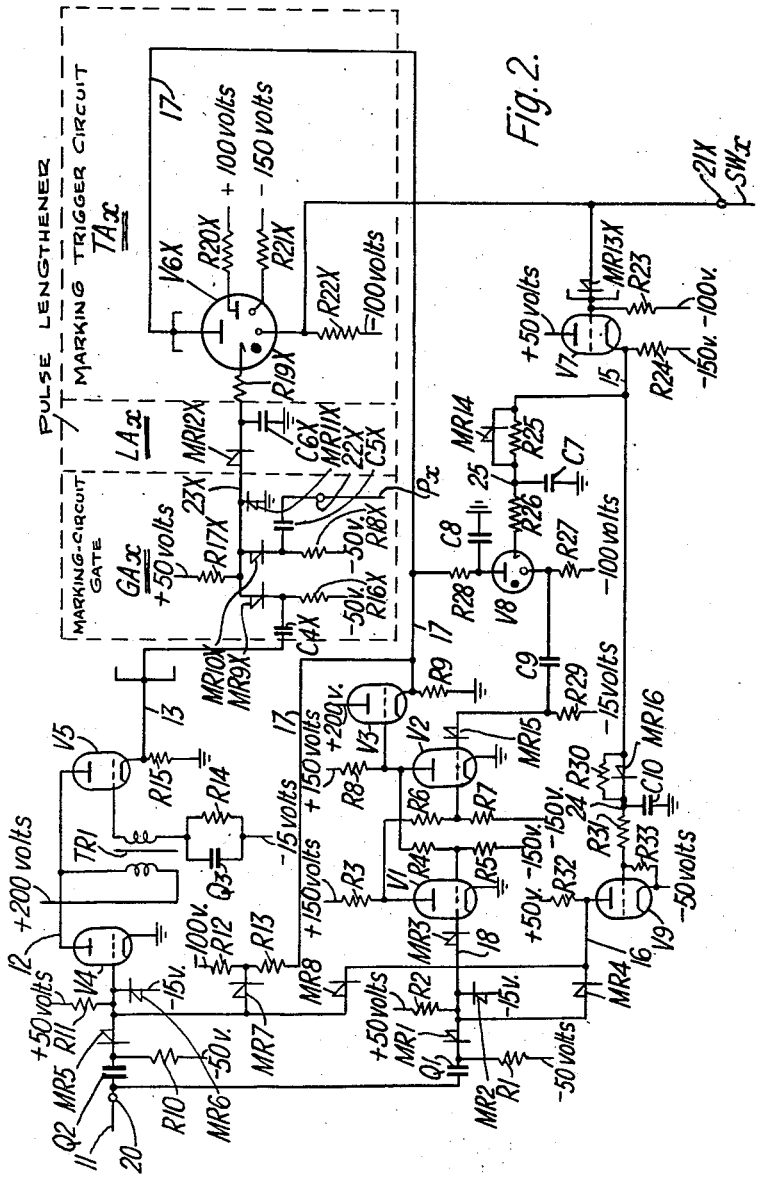
Figure 3:
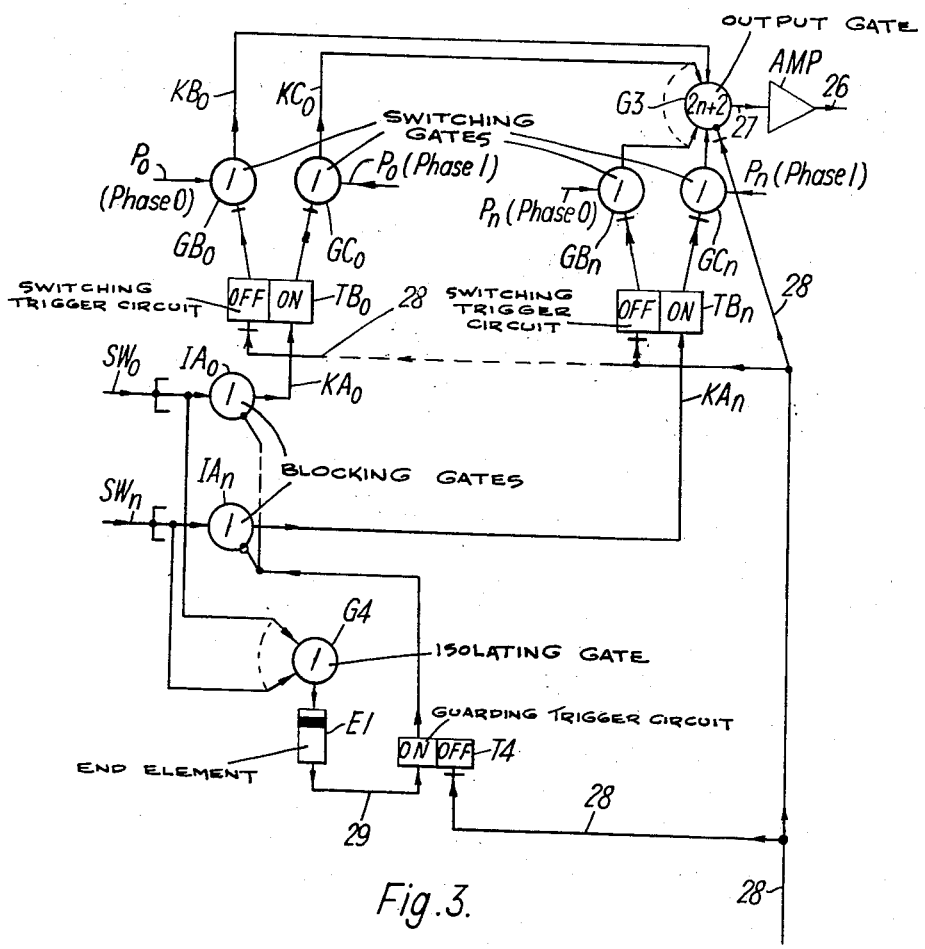
Figure 4:
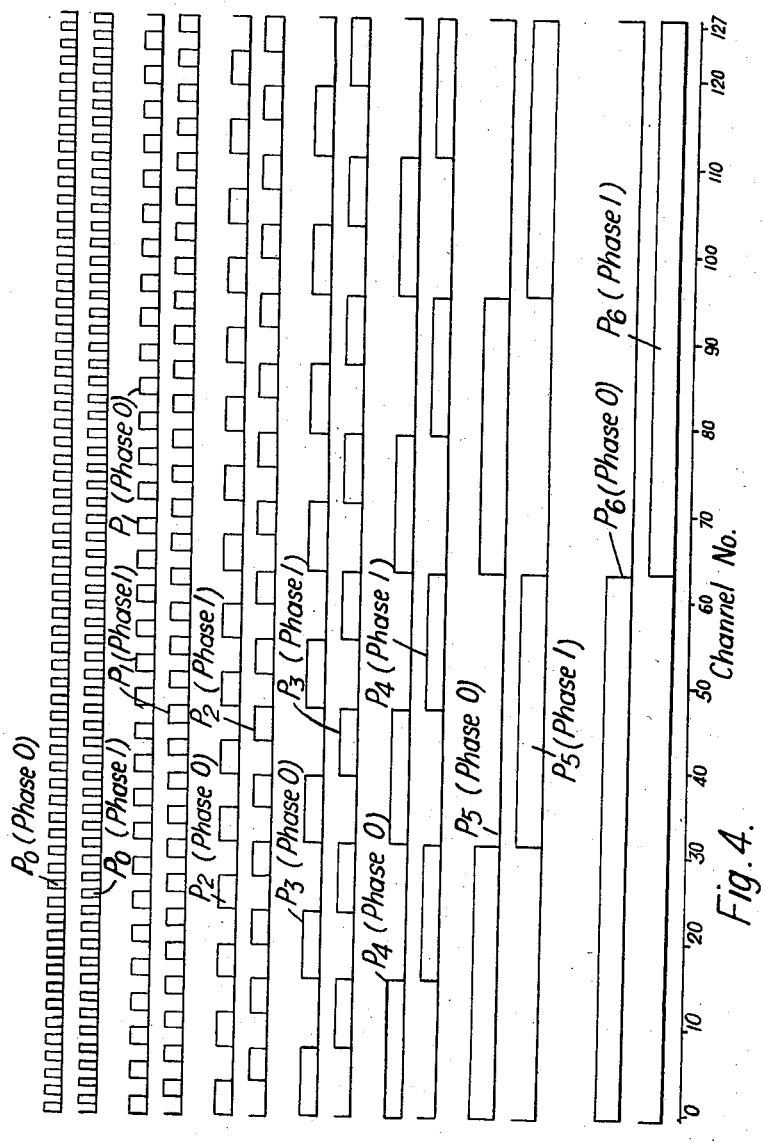
Figure 5:
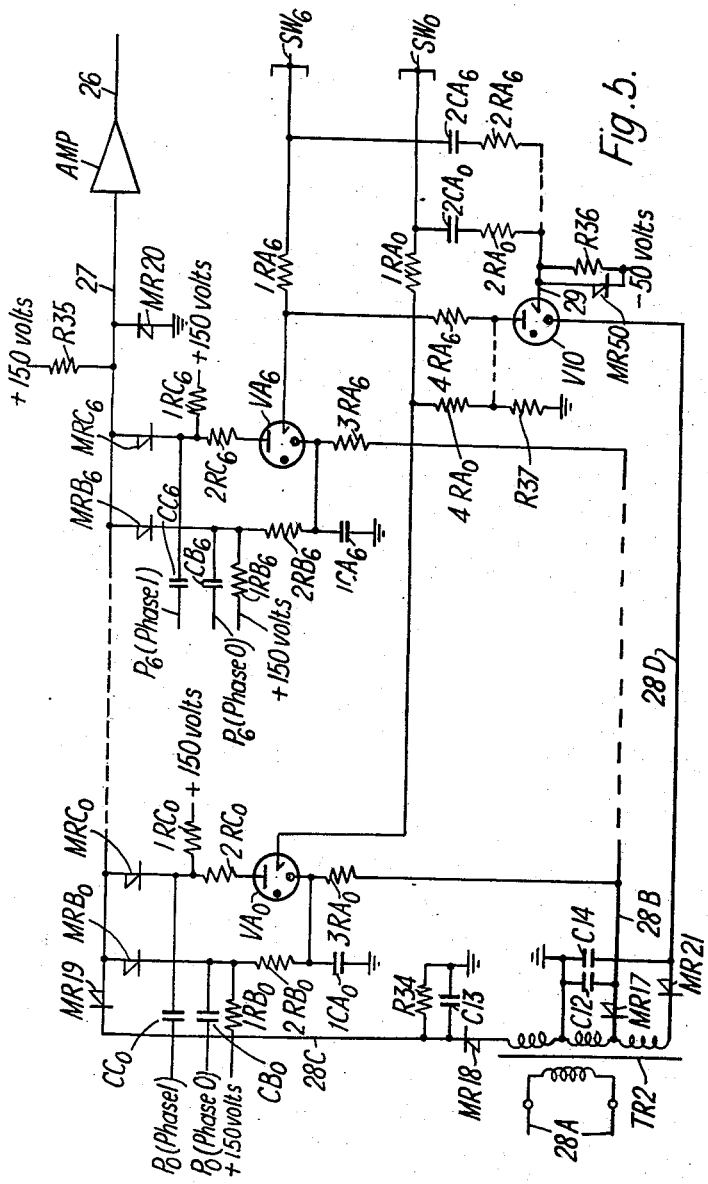
Figure 6:
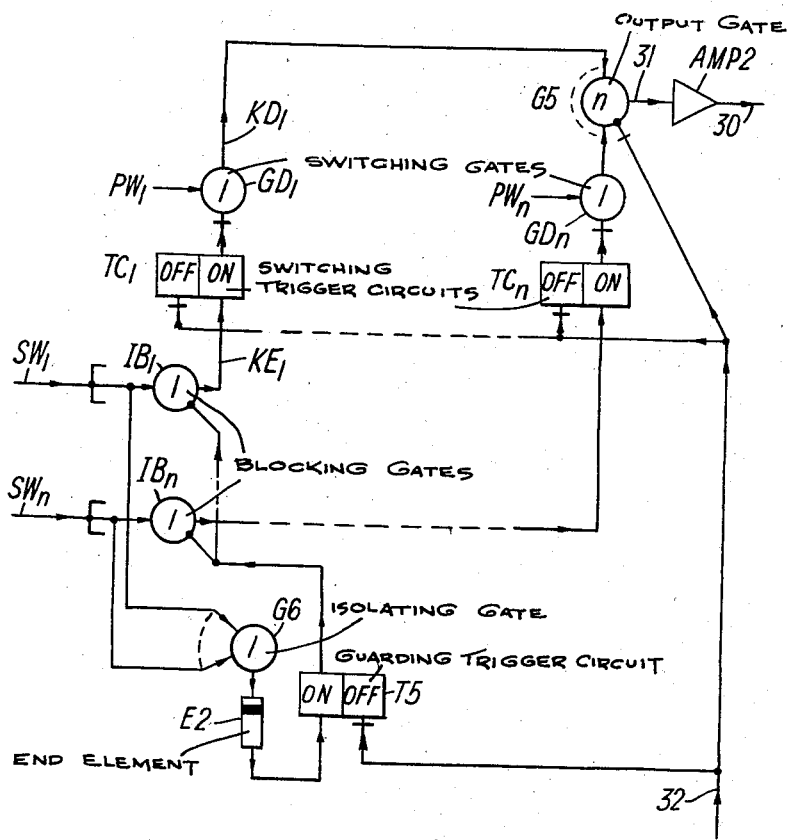
Figure 7:
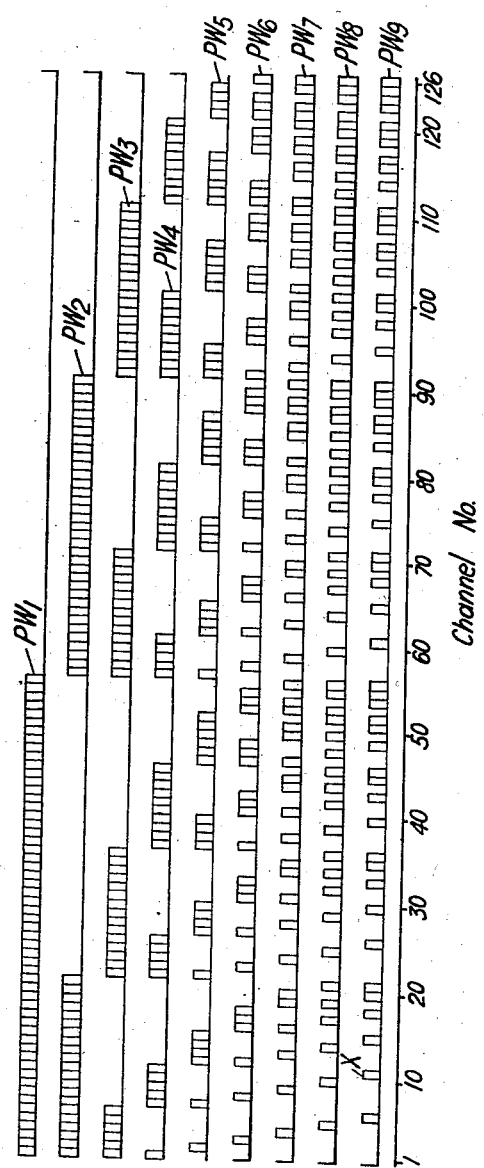
Figure 8:
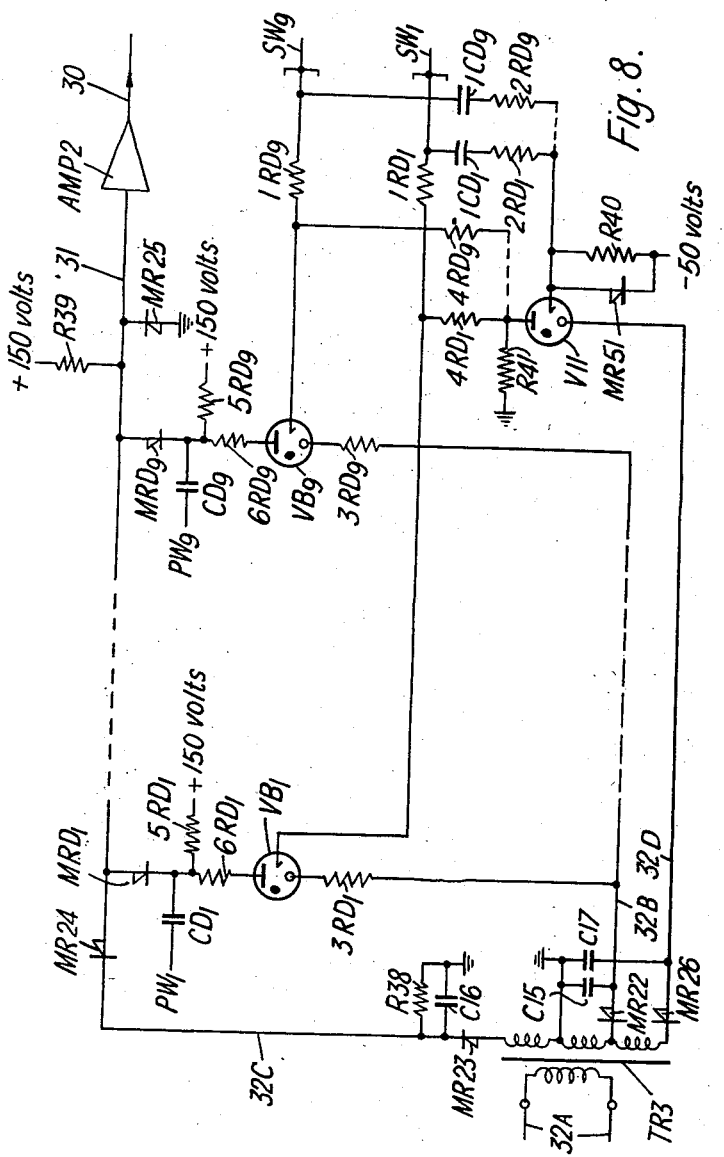
Figure 9:
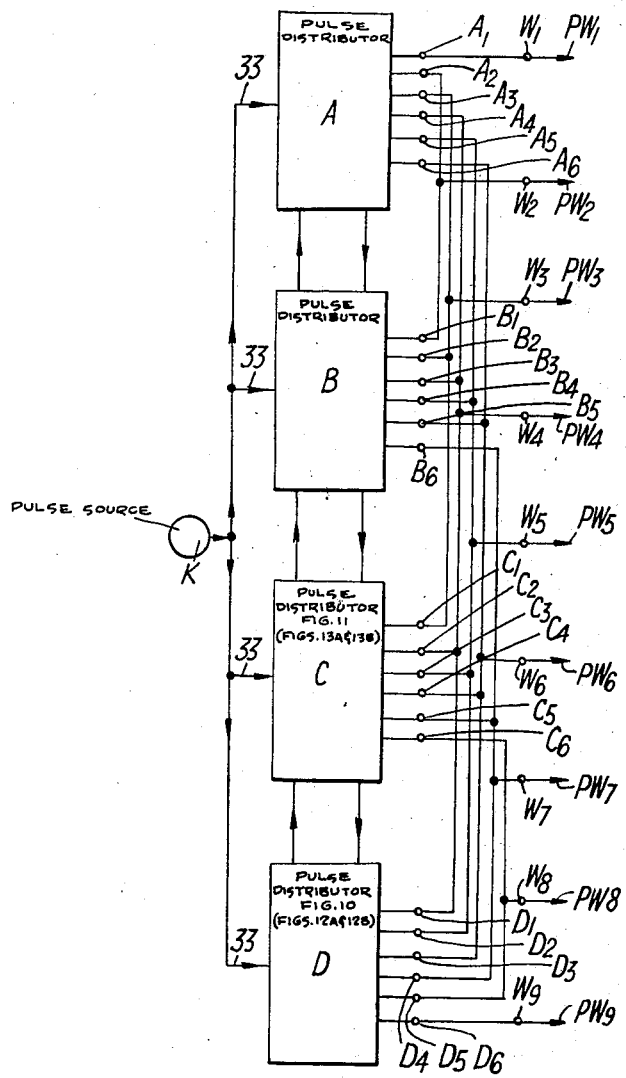
Figure 10:
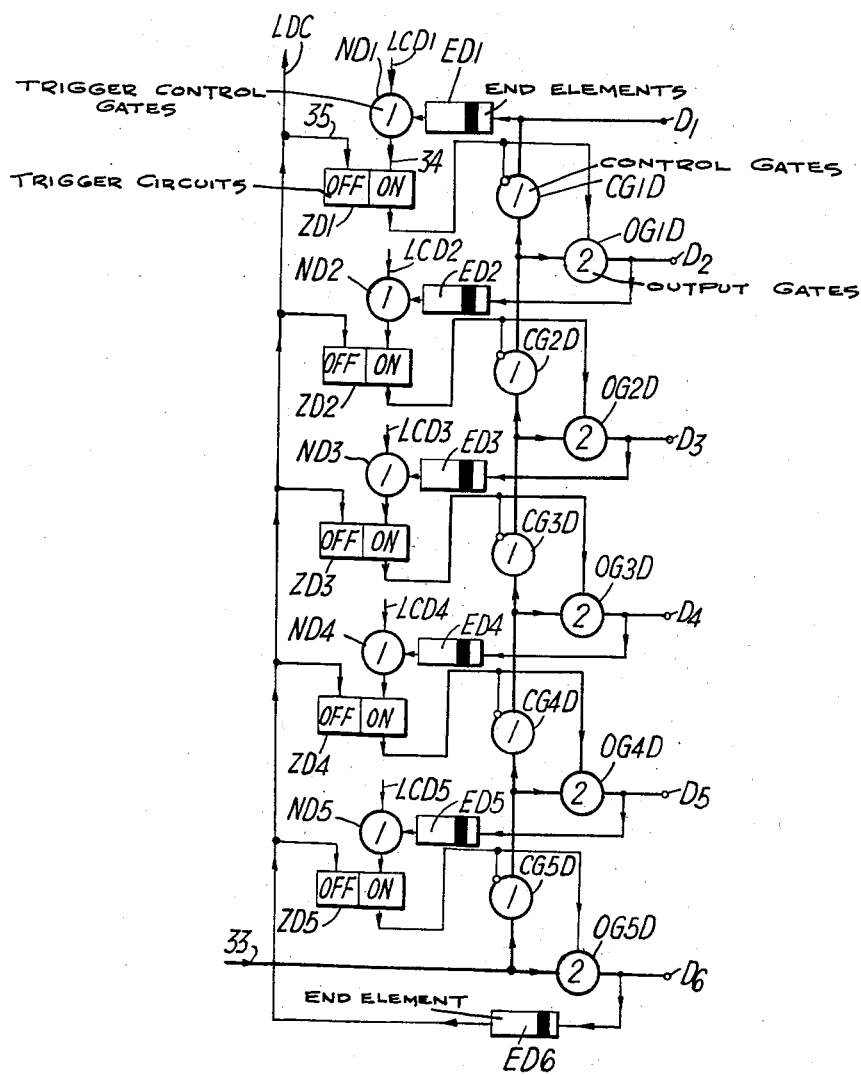
Figure 11:
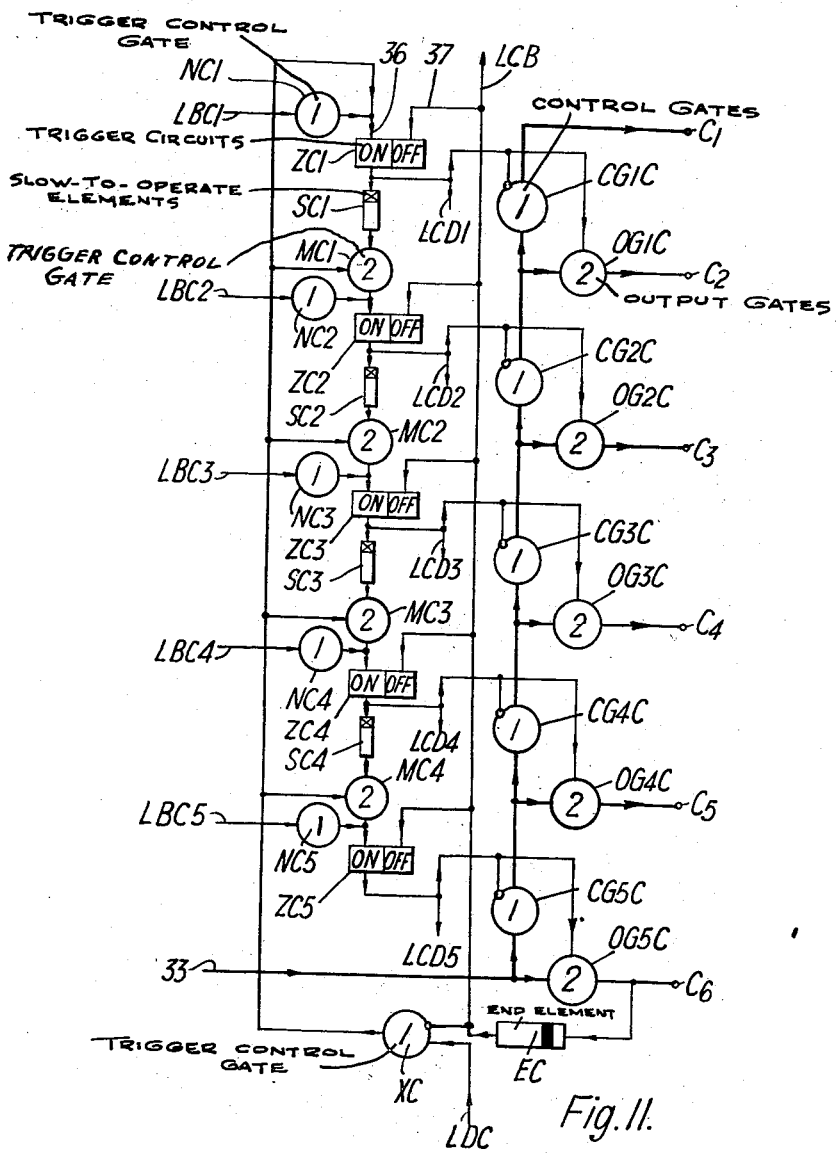
Figure 12A:
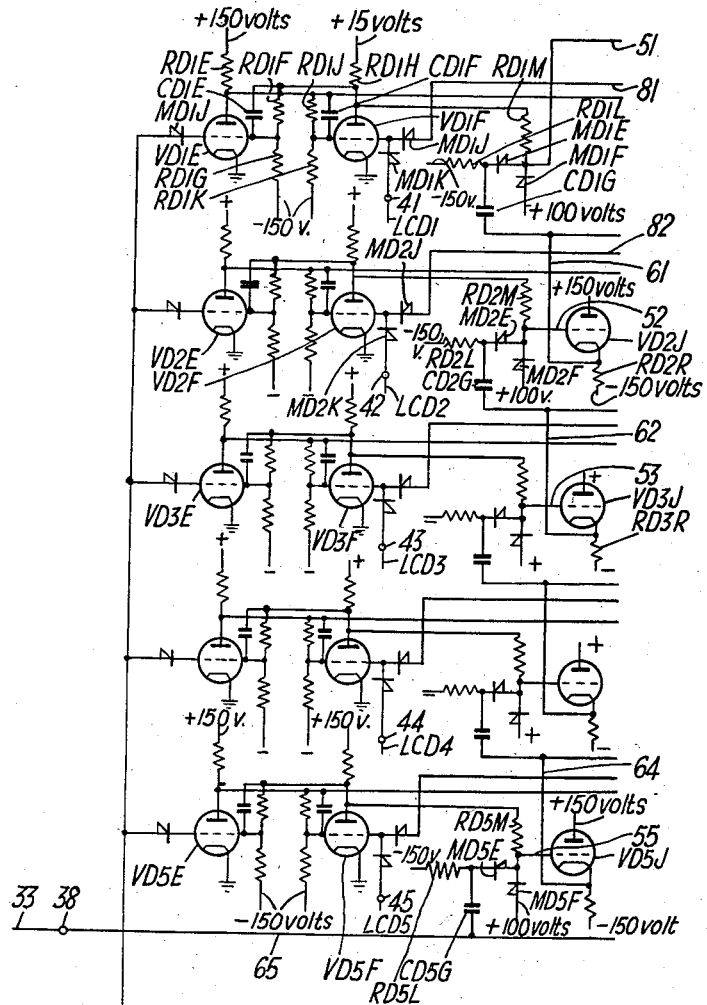
Figure 12B:
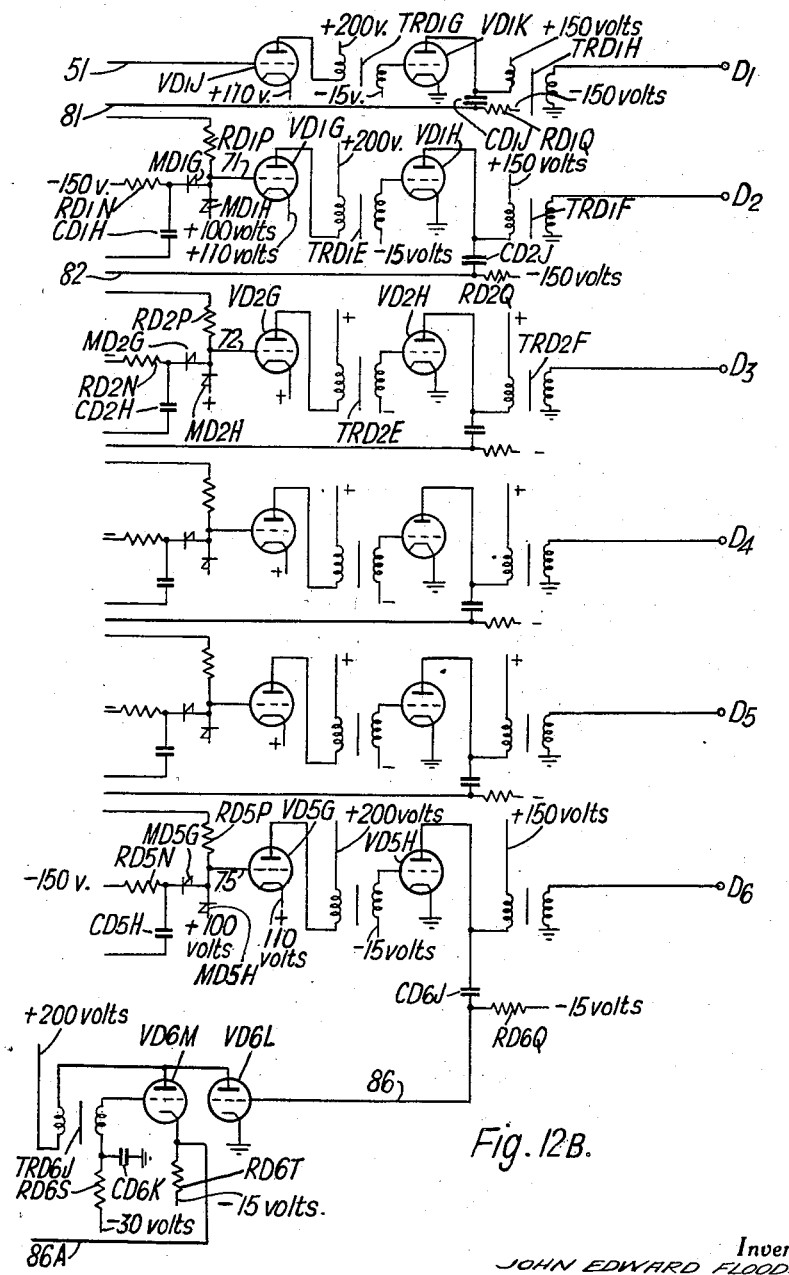

The features of the invention are exemplified in the specific forms of master selector, slave selector, and pulse generator which will now be described with reference to the accompanying drawings. Fig. 1 of the drawings is a schematic diagram of a master selector, and Fig. 2 is a circuit diagram illustrating suitable detailed circuit arrangements for constituting such a master selector. Fig. 3 is a schematic diagram of a slave selector arranged to receive selection-controlling signals from the assocaited master selector on a binary code basis. Fig. 4 is a waveform diagram illustrating the waveforms required to be produced by the pulse generator associated with a typical slave selector according to Fig. 3, and Fig. 5 is a circuit diagram illustrating suitable detailed circuit arrangements for constituting such a slave selector. Fig. 6 is a schematic diagram of a slave selector arranged to receive selection-controlling signals from the associated master selector on a code basis which in effect involves the use of some or all of those combinations of a group of connecting wires which are obtained by taking these wires a particular number at a time, the said particular number being of course less than the number of connecting wires in the group. Fig. 7 is a waveform diagram illustrating the waveforms required to be produced by the pulse generator associated with a typical slave selector according to Fig. 6, and Fig. 8 is a circuit diagram illustrating suitable detailed circuit arrangements for constituting such a slave selector. Fig. 9 is a block schematic diagram of a pulse generator which is suitable for use in association with the slave selector of Fig. 8 and which is arranged to produce the waveforms illustrated in Fig. 7. Fig. 10 is a schematic diagram of a distributor forming part of the pulse generator of Fig. 9, and Fig. 11 is a schematic diagram of another such distributor. Figs. 12A and 12B together form a circuit diagram illustrating suitable detailed circuit arrangements for constituting the distributor of Fig. 10, and Figs. 13A and 13B together form a circuit diagram illustrating suitable detailed circuit arrangements for constituting the distributor of Fig. 11. Fig. 14 is a block schematic diagram illustrating the constitution of, and showing how the improved master and slave selector arrangements of the present invention find an application in an electronic selecting switch of a type employed in a known form of exchange switching system of the kind in which connections are set up through a switching rank by means of a time division multiplex transmission system.

Referring now to Fig. 1, this schematic diagram of a master selector is of the so-called functional type. The form of master selector to which this figure pertains has incoming to it a marking pulse highway 11, and has outgoing from it a group of connecting wires of which only the first $SW_0$ and the last, or "$n$"th, $SW_n$ are shown. Pulses appearing on the pulse highway 11 at any time correspond to the time-division-multiplex channel or channels to which a slave selector associated with the master selector can then appropriately be set. The connecting wires $SW_0$ to $SW_n$ are multipled over all the slave selectors associated with the master selector. The function of the master selector, in respect of each call with which it is concerned, is to select a channel marked by the presence of the corresponding pulses on the pulse highway 1, and to indicate the selected channel to the slave selectors associated with the master selector. The indication just referred to is given as a code signal over the connecting wires $SW_0$ to $SW_n$, such a code signal being constituted (in the general case) by the application of a marking potential to a combination of these wires. For performing such application, the master selector has a marking trigger circuit corresponding to each of the wires $SW_0$ to $SW_n$. Of these marking trigger circuits, only the two $TA_0$ and $TA_n$, corresponding to the wires $SW_0$ and $SW_n$ respectively, are represented in the figure. Each marking trigger circuit has individual to it a gate (hereinafter for convenience in description termed a marking-circuit gate) such as $GA_0$ or $GA_n$ and a pulse lengthener (hereinafter for convenience in description termed a marking-circuit pulse lengthener) such as $LA_0$ or $LA_n$. Each marking-circuit gate is of the so-called coincidence type, and has a pulse supply input wire such as $P_0$ or $P_n$ and a control input wire. The pulse supply input wires of the marking-circuit gates are connected to corresponding output wires of the pulse generator serving the time-division-multiplex switching system concerned. This pulse generator is arranged so that in each channel time period of the time-division-multiplex system a pulse condition is produced or maintained on each of such a combination of the pulse supply input wires $P_0$ to $P_n$ that the application of a marking potential to the corresponding combination of the connecting wires $SW_0$ to $SW_n$ constitutes the code signal for indicating the channel concerned. In each channel time period the pulse generator does not of course produce or maintain a pulse condition on any pulse supply input wire which is not included in the combination unique to the channel. The combinations used depend upon the code basis on which the signalling over the connecting wires $SW_0$ to $SW_n$ is carried out. This signalling may conveniently be on a binary code basis, as will be described more fully later with reference to Figs. 3, 4, and 5. It may also conveniently be on a code basis which in effect involves the use of some or all of those combinations of the wires $SW_0$ to $SW_n$ which are obtained by taking these wires a particular number at a time, as will be described more fully later with reference to Figs. 6, 7, and 8. The control input wires of the marking-circuit gates $GA_0$ to $GA_n$ are constituted by branches of a selection pulse highway 13, and the output wire of each of these gates is linked by the corresponding marking-circuit pulse lengthener to the setting input wire of the corresponding marking trigger circuit. The marking pulse highway 11 is linked to the pulse highway 13 by a pulse selection gate I1 and an intermediate pulse highway 12 and a guarding gate I2, and is linked to the setting input wire 18 of a control trigger circuit T3 by a control gate I3. The output wire 17 of the trigger circuit T3 constitutes the resetting input wire of each of the marking trigger circuits $TA_0$ to $TA_n$, and also constitutes a first inhibiting input wire of the gate I1. The output wire 16 of a slow-to-release element SR1 constitutes a second inhibiting input wire of the gate I1, and also constitutes the sole inhibiting input wire of the gate I3. All the connecting wires $SW_0$ to $SW_n$ are linked to the wire 15, which constitutes the input wire of the element SR1, by an isolating gate G2. The wire 15 also constitutes the input wire of a slow-to-operate element SO2, which has its output wire 19 connected to constitute the resetting input wire of the trigger circuit T3. The arrangements for controlling the gate I2 comprise a guarding trigger circuit T1 and a slow-to-operate element SO1. A branch of the pulse highway 13 constitutes the setting input wire of the trigger circuit T1, and the output wire 14 of this trigger circuit constitutes the inhibiting input wire of the gate I2 and is linked by the element SO1 to the resetting input wire 10 of the trigger circuit.

When the master selector of Fig. 1 is at normal, and is required to perform its function in respect of a call, the channels from which it is to make a selection are marked by the appearance of the corresponding pulse trains on the marking pulse highway 11. The first pulse which passes through the normally-open control gate I3 sets the control trigger circuit T3 to its "on" condition, with the result that the normally-closed pulse selection gate I1 is opened. The first pulse to appear on the intermediate pulse highway 12 passes through the normally-open guarding gate I2 to the selection pulse highway 13 and sets the guarding trigger circuit T1 to its "on" condition, with the result that for a while the gate I2 is closed and prevents the transmission of further pulses from the pulse highway 12 to the pulse highway 13. The period for which the gate I2 is thus closed is terminated when an output from the slow-to-operate element SO1 resets the trigger circuit T1 to its "off" condition. It is arranged that this period is longer than the periodic time of the time-division-multiplex cycle. In the case of each of the marking-circuit gates $GA_0$ to $GA_n$, whether or not the appearance of the pulse on the pulse highway 13 causes the gate to feed an output pulse to the associated pulse lengthener depends upon whether or not the pulse on the highway 13 occurs in a channel time period in which a pulse condition exists on the pulse supply input wire of the gate. It is arranged that, no matter which channel time period is concerned, at least one marking-circuit gate does so feed an output pulse to the associated pulse lengthener. Thus the appearance of the pulse on the pulse highway 13 causes at least one of the pulse lengtheners $LA_0$ to $LA_n$ to receive a pulse, with the result that at least one of the marking trigger circuits $TA_0$ to $TA_n$ is set to its "on" condition to apply a marking potential to the corresponding one of the connecting wires $SW_0$ to $SW_n$. In this way the selected channel, that is the channel to which the pulse on the selection pulse highway 13 corresponds, is indicated to the slave selectors associated with the master selector. Upon the setting of the one or more marking trigger circuits, an operating potential is applied, through the medium of the isolating gate G2, to the slow-to-release element SR1 and the slow-to-operate element SO2. The output from the element SR1 closes the gates I1 and I3. The timing of the operations is arranged to be such that this closing of the gates I1 and I3 takes place before the gate I2 is opened by the resetting of the trigger circuit T1 to its "off" condition. After a time interval long enough to ensure that the setting of a slave selector takes place in response to the indication given over the connecting wires $W_0$ to $W_n$, the output from the element SO2 resets the control trigger circuit T3 to its "off" condition, with the result that each marking trigger circuit which has been set to its "on" condition is restored to its "off" condition and removes the marking potential from the corresponding one of the connecting wires $SW_0$ to $SW_n$. After a further time interval which is determined by the slow-to-release element SR1, and which is long enough to ensure that its termination is later than the resetting of the trigger circuit T1 to its "off" condition, the gates I1 and I3 are opened and the master selector is ready to function again.

Referring now to Fig. 2, this as has already been stated is a circuit diagram illustrating suitable detailed circuit arrangements for constituting a master selector according to Fig. 1. In Fig. 2, the terminal 20 is an input terminal which is connected, as indicated in the figure, to the marking pulse highway 11. The pulses received on this highway are positive pulses. The figure only shows one of the marking trigger circuits, one of the marking-circuit gates, and one of the marking-circuit pulse lengtheners, namely the trigger circuit $TA_x$, the gate $GA_x$, and the pulse lengthener $LA_x$. The terminal 21X is an output terminal which is individual to the trigger circuit $TA_x$ and which is connected, as indicated in the figure, to the outgoing connecting wire $SW_x$ with which this trigger circuit, the gate $GA_x$, and the pulse lengthener $LA_x$ are associated. There is of course an output terminal for each marking trigger circuit.

The normally-open control gate I3 comprises a capacitor Q1, three rectifiers MR1, MR2, and MR4, and two resistors R1 and R2. During periods in which the master selector is at normal, the rectifiers MR1 and MR2 are conducting, and the rectifier MR4 is biased to the non-conducting condition by the potential applied (in the slow-to-release element SR1) to the wire 16. With the rectifier MR2 conducting, the setting input wire 18 of the control trigger circuit T3 is held at a potential of about 15 volts negative. When, with the master selector at normal, a positive pulse appears on the marking pulse highway 11, the resulting increase of voltage across the resistor R1 causes the rectifier MR1 to be biased to the non-conducting condition. The termination of the flow of current through the rectifier MR1 causes the rectifier MR2 to be biased to the non-conducting condition and a positive-going pulse to appear on the wire 18.

The control trigger circuit T3 comprises three thermionic valves V1, V2, and V3 (all triodes), a capacitor C9, two rectifiers MR3 and MR15, and eight resistors R3, R4, R5, R6, R7, R8, R9, and R29. When the master selector is at normal so that this trigger circuit is in its "off" condition, the valve V2 is conducting, and the valve V1 is biased to the anode current cut-off condition by reason of the fact that the rectifier MR3 is conducting and holds the control grid of this valve at about the same potential (i.e. about 15 volts negative) as the setting input wire 18. The valves V1 and V2 are connected to constitute a bi-stable trigger arrangement. When the positive-going pulse appears on the wire 18 as previously mentioned, the resulting change of potential of the control grid of the valve V1 brings this valve to the conducting condition. By reason of the coupling constituted by the resistors R3, R6, and R7, the flow of anode current in the valve V1 causes the potential of the control grid of the valve V2 to be lowered to a value (not very different from 15 volts negative) at which it is held by the flow of current over the resistor R29 and the rectifier MR15, and at which the valve V2 is biased to the anode current cut-off condition. Upon the termination of the pulse on the wire 18, the grid of the valve V1 remains less negative than normal owing to the effect of the coupling, to the valve V2, which is constituted by the resistors R8, R4, and R5, and the valve V1 remains in the conducting condition. When the valve V2 is brought to the anode current cut-off condition, the resulting increase of the potential of the anode of this valve causes a large increase in the anode current of the valve V3. As the result of this increase of anode current, the voltage drop across the cathode resistor R9 becomes sufficient to provide, on the output wire 17 of the control trigger circuit, an effective positive high-tension supply voltage for a cold-cathode gas-filled valve V8 included in the slow-to-operate element SO2 and for the cold-cathode gas-filled valves (such as V6X) of the marking trigger circuits.

The normally-closed pulse selection gate I1 comprises a thermionic valve V4 (a triode), a capacitor Q2, four rectifiers MR5, MR6, MR7, and MR8, and four resistors R10, R11, R12, and R13. During periods in which the master selector is at normal, the rectifiers MR5, MR6, and MR7 are conducting, and the rectifier MR8 is biased to the non-conducting condition by the potential applied (in the slow-to-release element SR1) to the wire 16. With the rectifier MR6 conducting, the grid of the valve V4 is held at a potential of about 15 volts negative, with the result that this valve is biased to the anode current cut-off condition. The values of the resistors R11, R12, R13, and R9 are such that termination of the flow of current through the rectifier MR5 cannot cause the rectifier MR6 to be biased to the non-conducting condition unless the control trigger circuit T3 has previously been set to its "on" condition. Upon the setting, as previously described, of the trigger circuit T3 in response to the appearance of a positive pulse on the marking pulse highway 11, the resulting change in the potential of the wire 17 has the effect of biasing the rectifier MR7 to the non-conducting condition. Thus the gate I1 is brought to the open condition, that is, in the condition in which the rectifiers MR5 and MR6 are conducting and the rectifiers MR7 and MR8 are non-conducting. In these circumstances, when the increase of voltage across the resistor R10 resulting from the same or the next pulse on the pulse highway 11 causes (as it does) the rectifier MR5 to be biased to the non-conducting condition, the termination of the flow of current through this rectifier causes the rectifier MR6 to be biased to the non-conducting condition and a positive-going pulse to appear at the grid of the valve V4. As a result of this, the valve V4 passes anode current for a brief period and thereby produces a negative-going pulse on the intermediate pulse highway 12.

The normally-open guarding gate I2, the guarding trigger circuit T1, and the slow-to-operate element SO1 of Fig. 1 are all constituted by a single-valve trigger circuit arranged as a so-called blocking oscillator circuit. This single-valve trigger circuit comprises a thermionic valve V5 (a triode), a transformer TR1, a capacitor Q3, and two resistors R14 and R15. Normally, this trigger circuit is in a stable condition in which the valve V5 is biased to the anode current cut-off condition. The production, as previously mentioned and whilst this trigger circuit is in its normal condition, of a negative-going pulse on the pulse highway 12 causes this trigger circuit to be triggered to an unstable condition which is soon terminated, and in which a substantial current flows through the cathode resistor R15, and in which grid current flows through the resistor R14. The flow of current through the cathode resistor R15 results in the appearance, on the selection pulse highway 13, of a positive-going pulse which occurs in the same time period of the time-division-multiplex cycle as the relevant pulse on the marking pulse highway 11. The flow of grid current through the resistor R14 causes the capacitor Q3 to become charged to an extent which inhibits further triggering of the single-valve trigger circuit for a delay period longer than the periodic time of the time-division-multiplex cycle.

All the marking-circuit gates are similar to the gate $GA_x$ shown, which comprises a pulse supply input terminal 22X, two capacitors C4X and C5X, three rectifiers MR9X, MR10X, and MR11X, and three resistors R16X, R17X, and R18X. The pulse supply input terminal 22X is connected to the relevant pulse supply input wire $P_x$. The pulses applied to the pulse supply input wires such as $P_x$ are positive-going pulses. The gate $GA_x$ is of the so-called coincidence type. During the intervals between the pulses on the pulse supply input wire $P_x$ the rectifier MR10X is conducting, and in the absence of a pulse on the selection pulse highway 13 the rectifier MR9X is conducting. The values of the resistors R16X, R17X, and R18X are such that, as long as at least one of the rectifiers MR9X and MR10X is conducting, then the rectifier MR11X is conducting and the wire 23X is held at substantially earth potential. Upon the appearance of a positive-going pulse on the pulse supply input wire $P_x$, the resulting increase of voltage across the resistor R18X causes the rectifier MR10X to be biased to the non-conducting condition. Upon the production, as previously mentioned, of a positive-going pulse on the selection pulse highway 13, the resulting increase of voltage across the resistor R16X causes the rectifier MR9X to be biased to the non-conducting condition. If this pulse on the pulse highway 13 occurs in a channel time period in which a pulse is produced on the pulse supply input wire $P_x$, then the resulting coincident biasing of each of the rectifiers MR9X and MR10X to the non-conducting condition causes the rectifier MR11X to be biased to the non-conducting condition and a positive-going pulse to appear on the wire 23X.

All the marking-circuit pulse lengtheners are similar to the pulse lengthener $LA_x$ shown, which comprises a rectifier MR12X and a capacitor C6X. The production, as just mentioned, of a positive-going pulse on the wire 23X results in the charging of the capacitor C6X in the circuit over the rectifier MR12X. The charge on the capacitor can only leak away slowly so far as the charging path is concerned, so that the requisite pulse-lengthening effect is produced.

All the marking trigger circuits are similar to the marking trigger circuit $TA_x$ shown, which comprises a cold-cathode gas-filled valve V6X and four resistors R19X, R20X, R21X, and R22X. The valve V6X has its trigger electrode connected to the pulse lengthener $LA_x$ over the resistor R19X, and is of a kind having an auxiliary gap, a circular being provided over the resistors R20X and R21X for maintaining a continuous discharge between the electrodes of the auxiliary gap whereby the valve is enabled to operate from the charge available from the pulse lengthener capacitor C6X. Upon the charging of the capacitor C6X as previously mentioned, the valve V6X fires so that its cathode potential, and therefore the potential of the outgoing connecting wire $SW_x$, rises by reason of the voltage drop across the cathode resistor R22X. The potential to which the wire $SW_x$ is thus brought constitutes the marking potential.

The isolating gate G2 comprises a thermionic valve V7 (a triode) an input rectifier for each marking trigger circuit, and two resistors R23 and R24. Only one of the input rectifiers, namely the input rectifier MR13X associated with the marking trigger circuit $TA_x$, is shown. Upon the setting of one or more of the marking trigger circuits, the resulting rise in the potential of the grid of the valve V7 brings the anode current of this valve to a value at which the cathode assumes substantially earth potential by reason of the voltage drop across the cathode resistor R24. Thus the wire 15, constituting the input wire of the elements SR1 and SO2, is brought to substantially earth potential.

The slow-to-release element SR1 comprises a thermionic valve V9 (a triode), a rectifier MR16, a capacitor C10, and four resistors R30, R31, R32, and R33. When the wire 15 is brought to substantially earth potential as just mentioned, the point 24 almost immediately assumes substantially the same potential by reason of the relatively low-resistance path which the rectifier MR16 provides for removing the charge from the capacitor C10. The resulting rise in the potential of the control grid of the valve V9 causes this valve, normally biased to the anode current cut-off condition, to pass an anode current of a value at which the anode, by reason of the voltage drop across the resistor R32, assumes a potential negative with respect to earth. Thus the wire 16 is brought to a potential at which the rectifiers MR4 and MR8 are conducting and the gates I1 and I3 are closed. This closing of the gates I1 and I3 takes place before the circuit of the valve V5 has attained a condition in which further triggering is possible.

The slow-to-operate element SO2 comprises a cold-cathode gas-filled valve V8, two capacitors C7 and C8, a rectifier MR14, and four resistors R25, R26, R27, and R28. When the wire 15 is brought to substantially earth potential as previously mentioned, the rectifier MR14 becomes biased to the non-conducting condition by reason of the previously-created charge on the capacitor C7. The potential of the point 25 rises slowly to that of the wire 15, the slow rise being due to the relatively high value of the resistor R25. After a delay long enough to ensure that the setting of a slave selector takes place in response to the indication given over the connecting wires such as $W_x$, the point 25 attains a potential at which the valve V8 fires. When the valve V8 fires, the consequent rise in the potential of its cathode has the effect of injecting a positive pulse into the grid circuit of the valve V2, with the result that the control trigger circuit T3 is reset to its "off" condition.

Upon the resetting of the control trigger circuit T3 to its "off" condition as just mentioned, the restoration of the normal low potential on the wire 17 extinguishes the valve V8 of the slow-to-operate element SO2 and the fired valve or valves (such as V6X) of the marking trigger circuits. The wire 15 thereupon assumes its normal negative potential, with the result that the rectifier MR16 of the slow-to-release element SR1 becomes biased to the non-conducting condition. The potential of the point 24 falls slowly to that of the wire 15 as the capacitor C10 charges, the slow fall being due to the relatively high value of the resistor R30. After a delay long enough to ensure that its termination is both later than the resetting of the circuit of the valve V5 to its "off" condition and than the restoration to normal of all the marking-circuit pulse lengtheners and marking trigger circuits the point 24 attains a potential such that the master selector is ready to function again. This potential of the point 24 is the one at which the anode current of the valve V9 is reduced sufficiently to bring the wire 16 to a potential at which each of the rectifiers MR4 and MR8 is again biased to the non-conducting condition.

Referring now to Fig. 3, this schematic diagram of a slave selector is of the so-called functional type. The form of slave selector to which this figure pertains is arranged to receive selection-controlling signals from the associated master selector on a binary code basis. Of the group of connecting wires incoming from the master selector, only the first $SW_0$ and the last $SW_n$ are shown. These two connecting wires $SW_0$ and $SW_n$ correspond, of course, to the connecting wires similarly designated in Fig. 1. The connecting wires $SW_0$ to $SW_n$ are multiplied over all the slave selectors associated with the same master selector. The slave selector has outgoing from it an output pulse highway. The function of the slave selector, in respect of each call for which it is taken into use, is to apply a pulse to the output pulse highway 26 in each channel time period (of the time-division-multiplex system concerned) pertaining to the particular channel indicated by the binary code signal received from the master selector over the connecting wires $SW_0$ to $SW_n$. The slave selector has a switching trigger circuit corresponding to each of the wires $SW_0$ to $SW_n$. Of these switching trigger circuits, only the two $TB_0$ and $TB_n$, corresponding to the wires $SW_0$ and $SW_n$ respectively, are represented in the figure. Each switching trigger circuit has individual to it a blocking gate such as $IA_0$ or $IA_n$, and a pair of switching gates such as the pair $GB_0$ and $GC_0$ or the pair $GB_n$ and $GC_n$. Each switching gate, in addition to a control input wire from the associated switching trigger circuit has a pulse supply input wire such as the wire designated $P_0$ (Phase 0) or the wire designated $P_0$ (Phase 1) or the wire designated $P_n$ (Phase 0) or the wire designated $P_n$ (Phase 1). For convenience in description, the gates such as $GB_0$ and $GB_n$ will hereinafter be termed Phase 0 switching gates, and the gates such as $GC_0$ and $GC_n$ will hereinafter be termed Phase 1 switching gates. The output wires of all the switching gates constitute control input wires of an output gate G3, which is of the coincidence type, and which has an output wire 27 which is linked to the output pulse highway 26 by an amplifier AMP. As will be clear from the figure, two pulse supplies are in effect associated with each switching trigger circuit, and the switching trigger circuits and the switching gates are arranged so that, when a switching trigger circuit is in the "off" condition, the condition of the output wire such as $KB_0$ of the Phase 0 switching gate associated with the trigger circuit varies in correspondence with the pulses on the pulse supply input wire connected to this Phase 0 switching gate but the condition of the output wire such as $KC_0$ of the Phase 1 switching gate associated with the trigger circuit does not vary in correspondence with the pulses on the pulse supply input wire connected to this Phase 1 switching gate, and so that, when a switching trigger circuit is in the "on" condition, the converse is the case. The output gate G3 is arranged so that it cannot produce an output pulse on the wire 27 unless a holding and engaging tone signal condition exists on a holding wire 28 of the slave selector, and so that it, when such a tone signal condition does exist on the wire 28, functions to produce an output pulse only in response to the coincident occurrence of the pulse condition on each of those control input wires which, in respect of the call concerned, have their conditions varied in correspondence with pulses on pulse supply input wires such as $P_0$ (Phase 0) or $P_0$ (Phase 1). The control input wires of the gate G3 which, in respect of a call, have their conditions varied in correspondence with pulses on pulse supply input wires are $n+1$ in number, and comprise each control input wire which is connected to a Phase 0 switching gate which is associated with a switching trigger circuit in the "off" condition, and each control input wire which is connected to a Phase 1 switching gate which is associated with a switching trigger circuit in the "on" condition. The $2n+2$ pulse supply input wires such as $P_0$ (Phase 0) and $P_0$ (Phase 1) are connected to corresponding output wires of the pulse generator serving the time-division-multiplex switching system concerned. These output wires are multiplied over the slave selectors. The pulses which the pulse generator produces on the pulse supply input wires are of substantially rectangular waveform, and have durations equal to half their periodic times. The pulses produced on the two pulse supply input wires constituting a pair such as for example the pair $P_0$ (Phase 0) and $P_0$ (Phase 1), are like pulses of the same recurrence frequency. The pulses on the two pulse supply input wires constituting a pair are, however, of opposite phase. In other words, Phase 0 pulses occur in the gaps between corresponding Phase 1 pulses, and Phase 1 pulses occur in the gaps between corresponding Phase 0 pulses. The recurrence frequency of the pulses produced on the pulse supply input wires $P_1$ (Phase 0) and $P_1$ (Phase 1) is half that of the pulses produced on the pulse supply input wires $P_0$ (Phase 0) and $P_0$ (Phase 1), the recurrence frequency of the pulses produced on the wires $P_2$ (Phase 0) and $P_2$ (Phase 1) is half that of the pulses produced on the wires $P_1$ (Phase 0) and $P_1$ (Phase 1), and so on. Further, the recurrence frequency of the pulses produced on the pulse supply input wires $P_0$ (Phase 1) and $P_0$ (Phase 2) is such that each of these pulses has a duration equal to, and corresponding to, the period allowed for a channel (herein termed a channel time period) in a complete cycle of the time-division-multiplex system concerned. The pulses produced on the wire $P_0$ (Phase 0) correspond to the channel time periods pertaining to channels Nos. 0, 2, 4, 6, ... of the multiplex systems. The pulses produced on the wire $P_0$ (Phase 1) correspond to the channel time periods pertaining to channels Nos. 1, 3, 5, 7, ... of the multiplex system. The pulses produced on the wire $P_1$ (Phase 0) extend over the pairs of channel time periods pertaining to the pairs of channels comprising channels Nos. 0 and 1, 4 and 5, 8 and 9, ... whilst the pulses produced on the wire $P_1$ (Phase 1) extend over the pairs of channel time periods pertaining to the pairs of channels comprising channels Nos. 2 and 3, 6 and 7, 10 and 11, ..., and so on.

The voltage waveforms required to be produced by the pulse generator in the specific case where $n$ of Fig. 3 is equal to 6 are illustrated in Fig. 4. In the case of each waveform shown the continuous horizontal line represents a datum voltage and the pulses are positive pulses above this line. Each waveform is given the same designation as the corresponding pulse supply input wire of Fig. 3. The time base is marked to indicate channels. Since the specific case to which Fig. 4 pertains is one where there are seven connecting wires $SW_0$, $SW_1$, ..., and $SW_6$ (Fig. 3), and since the signalling over these wires is on a binary code basis, the total number of channels provided for, so far as unique code signals and corresponding unique possible combinations of conditions on the wires such as $KB_0$ and $KC_0$ (Fig. 3) are concerned, is $2^7$ or 128. The recurrence frequency of the pulses produced on the pulse supply input wires $P_0$ (Phase 0) and $P_0$ (Phase 1) may conveniently and satisfactorily be 0.5 megacycle, in which case each channel time period has a duration of one microsecond. The pulses on the remaining pulse supply input wires may conveniently be obtained by frequency division, in known manner, from the basic supply at a frequency of 0.5 megacycle, the various pulse trains being synchronized with the channel time periods of the time-division-multiplex cycle.

Referring again to Fig. 3, the slave selector to which this figure pertains includes a guarding trigger circuit T4. All the connecting wires such as $SW_0$ and $SW_n$ are linked to the setting input wire 29 of the trigger circuit T4 by an isolating gate G4 and a so-called end element E1.

When the slave selector of Fig. 3 is at normal, and is required to perform its function in respect of a call, the holding and engaging tone signal condition appears on its holding wire 28, and the associated master selector applies the marking potential to a combination of the wires $SW_0$ to $SW_n$ to indicate the channel to be selected. As will have appeared from the description already given, the function of the slave selector is to select the required channel by taking up a condition in which it applies a pulse to the output pulse highway 26 in each channel time period pertaining to that channel. The holding and engaging tone signal condition on the holding wire 28 may be applied at a prior switching rank or line circuit. Where the master selector of Fig. 1 is used in association with the slave selector of Fig. 3, the pulse supply input wire $P_0$ of the master selector is connected to the same output wire of the pulse generator as the pulse supply input wire $P_0$ (Phase 1) of the slave selector, the wire $P_1$ of the master selector is connected to the same output wire of the pulse generator as the pulse supply input wire $P_1$ (Phase 1) of the slave selector, and so on. In the absence of the holding and engaging tone signal condition on the holding wire 28, the output gate G3 is inhibited from producing an output pulse, and the switching trigger circuits such as $TB_0$ and $TB_n$ and the guarding trigger circuit T4 are maintained in their "off" conditions. Upon the appearance of the holding and engaging tone signal condition on the wire 28, the slave selector is enabled to respond to the binary code signal given by the master selector over the wires $SW_0$ to $SW_n$. In the case of each of these wires to which the marking potential is applied for the purpose of giving this code signal, a setting condition appears on the setting input wire (such as $KA_0$ or $KA_n$) of the corresponding switching trigger circuit (such as $TB_0$ or $TB_n$), with the result that this trigger circuit is set to its "on" condition. Subsequent to such setting the number of the channel concerned is represented in binary code by the pattern of the "on" and "off" switching trigger circuits, the "on" condition corresponding to a "1" of the binary code and the "off" condition corresponding to a "0" of the binary code. It will be clear from the description already given and from the figure that the output gate G3 receives Phase 0 pulses in respect of each "0" of the binary code representing the number of the channel concerned, and received Phase 1 pulses in respect of each "1" of this binary code representation. The pulse supplies to the switching gates (such as $GB_0$ and $GC_0$) are such that no matter what binary code signal is given by the master selector over the wires $SW_0$ to $SW_n$, the coincident occurrence of the pulse condition on each of the relevant $n+1$ of the $2n+2$ leads such as $KB_0$ and $KC_0$ happens in only one channel time period of the time-division-multiplex cycle. Thus the output gate G3 produces only one output pulse in each complete time-division-multiplex cycle, this output pulse occurring in the channel time period pertaining to the channel the number of which is represented in binary code by the pattern of the "on" and "off" switching trigger circuits. For example, in the specific case to which Fig. 4 applies (where $n$ is equal to 6), if the master selector applies the marking potential to wires $SW_0$, $SW_1$, and $SW_5$, but not to wires $SW_2$, $SW_3$, $SW_4$, and $SW_6$, the seven-place binary code pattern concerned is 0100011 and the channel number concerned is 35

$$0+2^5+0+0+0+2^1+2^0$$

being equal to 35. The switching trigger circuits set to the "on" condition are $TB_0$, $TB_1$, and $TB_5$, and the output gate G3 receives pulses corresponding to those appearing on the pulse supply input wires $P_0$ (Phase 1), $P_1$ (Phase 1), $P_2$ (Phase 0), $P_3$ (Phase 0), $P_4$ (Phase 0), $P_5$ (Phase 1), and $P_6$ (Phase 0). As will be clear from Fig. 4, the only channel time period in each time-division-multiplex cycle in which a pulse condition obtains on all of these seven wires is the channel time period pertaining to channel No. 35. Thus as long as the pattern of the "on" and "off" switching trigger circuits remains unchanged, and the holding and engaging tone signal condition persists on the wire 28, in each channel time period pertaining to channel No. 35 the output gate G3 produces an output pulse on the wire 27 and amplifier AMP applies a corresponding amplified pulse to the output pulse highway 26.

The guarding trigger circuit T4 of Fig. 3, and the associated isolating gate G4 and end element E1, operate to ensure that, once the slave selector has been set in response to a binary code signal from the master selector, and as long as the holding and engaging tone signal condition persists on the wire 28, any further code signals which may appear on the multipled connecting wires $W_0$ to $W_n$ have no effect on this particular slave selector. The particular method of performing this necessary guarding function which is shown in Fig. 3 relies upon there always being at least one "1" signal element present in the binary code signal received from the master selector to set the slave selector. This of course means that channel No. 0 (of the preceding description and Fig. 4) cannot be used as an effective channel for setting up connections. Whenever the master selector concerned removes the marking potential from the relevant one or more of the wires $SW_0$ to $SW_n$ after giving a binary code signal, the end element E1 applies a setting condition to the setting wire 29. During periods in which the slave selector is not in use, such application of a setting condition to the wire 29 has no effect, since in the absence of the holding and engaging tone signal condition on the holding wire 28 the trigger circuit T4 is maintained in its "off" condition. When, however, such application of a setting condition to the wire 29 occurs upon the removal from the wires $SW_0$ to $SW_n$ of a binary code signal condition in response to which the slave selector has been set, then the guarding trigger circuit T4 is set to its "on" condition, since in these circumstances the holding and engaging tone signal condition is present on the wire 28. Upon being set to its "on" condition, the trigger circuit T4 causes all the blocking gates such as $IA_0$ or $IA_n$ to block the transmission of the marking potential to the respective wires such as $KA_0$ and $KA_n$.

In one contemplated modification of the slave selector of Fig. 3, a slow-to-operate element is substituted for the end element E1 and is arranged to have an operating lag sufficient to ensure that a code signal received from the master selector has been operated upon before the guarding trigger circuit T4 is set to its "on" condition.

Another contemplated modification of the slave selector of Fig. 3 involves using a form of master selector which is a modification of the master selector of Fig. 1. These contemplated modifications are such that in the slave selector the isolating gate G4 is omitted, and the guarding trigger circuit T4 is arranged to be set to its "on" condition by a signal received over an additional wire from the master selector. The master selector is arranged to apply a setting condition to the said additional wire immediately before it, after applying a code signal condition to the wires $SW_0$ to $SW_n$, restores preparatory for further use. With these modifications the channel No. 0 (of the preceding description and Fig. 4) can be used as an effective channel for setting up connections.

Referring now to Fig. 5, this as has already been stated is a circuit diagram illustrating suitable detailed circuit arrangements for constituting a slave selector according to Fig. 3. This circuit diagram is drawn and designated for the specific case where $n$ of Fig. 3 is equal to 6, and to which Fig. 4 applies. The amplifier AMP linking the wire 27 to the output pulse highway 26 is merely represented schematically in the circuit diagram, since its nature in no way concerns the invention. It may be of any suitable known type. Of the group of seven connecting wires incoming from the master selector, only the first $SW_0$ and the last $SW_6$ are shown. Of those elements of the slave selector which are individual to the individual connecting wires such as $SW_0$ and $SW_6$, only the elements associated with the wires $SW_0$ and $SW_6$ are shown. The wires $P_0$ (Phase 0), $P_0$ (Phase 1), $P_6$ (Phase 0), and $P_6$ (Phase 1) are the pulse supply input wires corresponding to the wires $SW_0$ and $SW_6$. Each switching trigger circuit (corresponding to $TB_0$ or $TB_n$, Fig. 3) is so combined with the associated pair of switching gates (corresponding to $GB_0$ and $GC_0$, or $GB_n$ and $GC_n$, Fig. 3), and these switching gates are so combined with the output gate (corresponding to G3, Fig. 3) as to preclude a precise division of the apparatus represented in the circuit diagram among circuit elements corresponding to the circuit elements of the functional diagram of Fig. 3. Broadly, a cold-cathode gas-filled valve $VA_0$, a capacitor $ICA_0$, and five resistors $3RA_0$, $1RB_0$, $2RB_0$, $1RC_0$, and $2RC_0$ can be said to constitute the switching trigger circuit ($TB_0$) corresponding to the connecting wire $SW_0$, and similarly the apparatus elements $VA_6$, $1CA_6$, $3RA_6$, $1RB_6$, $2RB_6$, $1RC_6$, and $2RC_6$ can be said to constitute the switching trigger circuit ($TB_6$) corresponding to the wire $SW_6$. A capacitor $CB_0$ and the resistor $1RB_0$ can in a way be looked upon as constituting one ($GB_0$) of the pair of switching gates associated with the switching trigger circuit $TB_0$, and a capacitor $CC_0$ and the resistor $1RC_0$ can similarly be looked upon as constituting the remaining gate ($GC_0$) of this pair. Correspondingly, two capacitors $CB_6$ and $CC_6$ and the two resistors $1RB_6$ and $1RC_6$ can be looked upon as constituting the pair of switching gates ($GB_6$ and $GC_6$) associated with the switching trigger circuit $TB_6$. Each switching gate has a rectifier (such as $MRB_0$ or $MRC_0$ or $MRB_6$ or $MRC_6$) individual to it. These rectifiers, together with two further rectifiers MR19 and MR20 and a resistor R35 can be looked upon as constituting the output gate G3. A pair of resistors $1RA_0$ and $4RA_0$ serve to constitute the blocking gate ($IA_0$) individual to the switching trigger circuit $TB_0$, and a pair of resistors $1RA_6$ and $4RA_6$ serve to constitute the blocking gate ($IA_6$) individual to the switching trigger circuit $TB_6$. Each of the seven connecting wires $SW_0$ to $SW_6$ has individual to it a resistor such as $2RA_0$ or $2RA_6$ and a capacitor such as $2CA_0$ or $2CA_6$. These resistors and capacitors, together with a further resistor R36, serve to constitute both the isolating gate G4 and the end element E1. A cold-cathode gas-filled valve V10 and a resistor R37 serve to constitute the guarding trigger circuit T4, the trigger electrode of the valve V10 being connected to the wire 29. The pair of wires 28A can be looked upon as corresponding to the holding wire 28 of Fig. 3, and the wires 28B, 28C, and 28D can be looked upon as corresponding to branches of the holding wire 28 of Fig. 3.

During periods in which the slave selector of Fig. 5 is not in use, the holding and engaging tone signal condition is not received over the wires 28A, and the potentials of the wires 28B and 28D are not materially different from earth and, since the resistance of the resistor R34 is low compared with that of the resistor R35, the potential of the wire 28C is only slightly above earth. In these circumstances, all the rectifiers such as $MRB_0$ and $MRC_0$, and the rectifier MR20, are biased to the non-conducting condition, and current flow through the rectifier MR19 holds the output wire 27 of the output gate G3 at a potential only slightly above earth. Further, in these circumstances the valves $VA_0$ to $VA_6$ and the valve V10 are all maintained in the non-conducting condition. When the slave selector is taken into use for a call, and the holding and engaging tone signal condition appears on the wires 28A and the associated master selector applies the marking potential to a combination of the connecting wires $SW_0$ to $SW_n$, each of the valves $VA_0$ to $VA_6$ which has its associated connecting wire marked is fired. This firing occurs, in the case of each valve concerned, by reason of the facts that the potential of the trigger electrode of the valve is raised by the marking of the relevant connecting wire, and that the potential of the wire 28B is lowered by the voltage produced from the holding and engaging tone by a rectifying combination comprising a transformer TR2, a rectifier MR17, and a capacitor C12. This firing constitutes, of course, in the case of each valve concerned, the setting of the relevant trigger circuit to the "on" condition. What happens in regard to each of the valves $VA_0$ to $VA_6$ which is not so fired, and what happens in regard to each of these valves which is so fired, will now be made clear by way of example by assuming that the valve $VA_0$ is not fired but the valve $VA_6$ is fired. Assuming, then, that the valve $VA_0$ is not fired, the rectifier MRC remains biased to the non-conducting condition by reason of its connection to positive battery over the resistor $1RC_0$, but, by reason of the lowering of the potential of the wire 28B, the connection of the rectifier $MRB_0$ to positive battery over the resistor $1RB_0$ no longer suffices to maintain the last-mentioned rectifier in the non-conducting condition. Each pulse appearing on the pulse supply input wire $P_0$ (Phase 0) does however serve to bias the rectifier $MRB_0$ to the non-conducting condition for the duration of the pulse. Assuming that the valve $VA_6$ is fired, the current flow through it has two effects. Firstly, this current flow, by tending to raise the potential of the cathode of the valve, causes the connection of the rectifier $MRB_6$ to positive battery over the resistor $1RB_6$ to continue to suffice to maintain this rectifier in the non-conducting condition, notwithstanding the lowering of the potential of the wire 28B. Secondly, the current flow through the valve $VA_6$ causes the connection of the rectifier $MRC_6$ to positive battery over the resistor $1RC_6$ to suffice no longer to maintain the last-mentioned rectifier in the non-conducting condition. Each pulse appearing on the pulse supply input wire $P_6$ (Phase 1) does however serve to bias the rectifier $MRC_6$ to the non-conducting condition for the duration of the pulse. Upon the appearance of the holding and engaging tone signal condition on the wires 28A, the potential of the wire 28C is raised considerably by the voltage produced from the tone by a rectifying combination comprising the transformer TR2, a rectifier MR18, and a capacitor C13. As the result of this raising of the potential of the wire 28C, the rectifier MR19 is biased to the non-conducting condition. It will be clear from what has just been said that, when the slave selector has been taken into use and has responded to the binary code signal given by the master selector, the conditions in the slave selector circuit are as follows. Each rectifier (such as $MRB_0$ in the example taken) which is individual to a Phase 0 switching gate which is associated with a switching trigger circuit in the "off" condition is conducting except for that portion of the time-division-multiplex cycle in which a pulse condition exists on the pulse supply input wire connected to this Phase 0 switching gate. Each rectifier (such as $MRC_6$ in the example taken) which is individual to a Phase 1 switching gate which is associated with a switching trigger circuit in the "on" condition is conducting except for that portion of the time-division-multiplex cycle in which a pulse condition exists on the pulse supply input wire connected to this Phase 1 switching gate. All the remaining rectifiers individual to switching gates remain biased to the non-conducting condition throughout the time-division-multiplex cycle, and so also does the rectifier MR19. Thus in that particular channel time period (of the time-division-multiplex cycle) which is signified by the binary code signal given by the master selector the condition obtains that none of the rectifiers $MRB_0$ to $MRB_6$, $MRC_0$ to $MRC_6$, and MR 19 is conducting, with the result that for the duration of this particular channel time period the potential of the wire 27 rises by reason of the connecto positive battery over the resistor R35. The pulse produced in this way on the wire 27 is amplified by the amplifier AMP and fed to the output pulse highway 26. During the channel time periods in which one or more of the rectifiers of the switching gates is or are conducting, the wire 27 is held at earth potential by current flow through the rectifier MR20.

During periods in which the holding and engaging tone signal condition is not received over the wires 28A, the fact that the wire 28D, and therefore the cathode of the valve V10, is at a potential not materially different from earth prevents this valve from being materially affected by the application and removal of the marking potential from the connecting wires $SW_0$ to $SW_6$. When the slave selector is taken into use for a call and the associated master selector applies the marking potential to a combination of these connecting wires, the consequent flow of current through the pairs of apparatus elements such as $2CA_0$ and $2RA_0$ is prevented from raising the potential of the trigger electrode of the valve V10 owing to the rectifier MR50. Upon the subsequent removal of the marking potential from the connecting wires concerned, the consequent flow of current through the resistor R36, due to the presence of the pairs of apparatus elements such as $2CA_0$ and $2RA_0$, lowers the potential of the trigger electrode of the valve V10, with the result that a discharge is initiated between the anode and the trigger electrode. Whilst the slave selector is in use with the holding and engaging tone signal condition present on the wires 28A, the potential of the wire 28D is maintained at a value considerably lower than normal by reason of the voltage produced from the tone by a rectifying combination comprising the transformer TR2, a rectifier MR21, and a capacitor C14. In these circumstances, the momentary discharge initiated as just mentioned between the anode and the trigger electrode of the valve V10 transfers from the trigger electrode to the cathode and is then maintained as long as the holding and engaging tone signal condition persists. With the valve V10 in the conducting condition, the trigger electrodes of the valves $VA_0$ to $VA_6$ are prevented, by the paths over the resistors such as $4RA_0$ and $4RA_6$, from assuming the striking potential. In other words, the gates $IA_0$ to $IA_n$ are closed.

Referring now to Fig. 6, this schematic diagram of a slave selector is of the so-called functional type. The form of slave selector to which this figure pertains is arranged to receive selection-controlling signals from the associated master selector on a code basis which in effect involves the use of some or all of those combinations of a group of connecting wires which are obtained by taking these wires a particular number (say $r$) at a time, the said particular number being of course less than the number (say $n$) of connecting wires in the group. Of the group of connecting wires incoming from the master selector, only the first $SW_1$ and the last, or "$n$"th, $SW_n$ are shown. There is no connecting wire corresponding to the connecting wire $SW_0$ of Fig. 1, and in this case the elements of Fig. 1 which are individual to the wire $SW_0$ are omitted from the master selector. The connecting wires $SW_1$ to $SW_n$ are multipled over all the slave selectors associated with the same master selector. The slave selector has outgoing from it an output pulse highway 30. The function of the slave selector, in respect of each call for which it is taken into use, is to apply a pulse to the output pulse highway 30 in each channel time period pertaining to the particular channel indicated by the code signal received from the master selector over the connecting wires $SW_1$ to $SW_n$. The slave selector has a switching trigger circuit corresponding to each of the wires $SW_1$ to $SW_n$. Of these switching trigger circuits, only the two $TC_1$ and $TC_n$, corresponding to the wires $SW_1$ and $SW_n$ respectively, are represented in the figure. Each switching trigger circuit has individual to it a blocking gate such as $IB_1$ or $IB_n$, and a switching gate such as $GD_1$ or $GD_n$. Each switching gate, in addition to a control input wire from the associated switching trigger circuit, has a pulse supply input wire such as $PW_1$ or $PW_n$. The output wires of all the switching gates constitute control input wires of an output gate G5, which is of the coincidence type, and which has an output wire 31 which is linked to the output pulse highway 30 by an amplifier AMP2. The switching trigger circuits and the switching gates are arranged so that, when a switching trigger circuit is in the "on" condition but not otherwise, the condition of the output wire such as $KD_1$ of the switching gate associated with the trigger circuit varies in correspondence with the pulses on the pulse supply input wire connected to this switching gate. The output gate G5 is arranged so that it cannot produce an output pulse on the wire 31 unless a holding and engaging tone signal condition exists on a holding wire 32 of the slave selector, and so that it, when such a tone signal condition does exist on the wire 32, functions to produce an output pulse only in response to the coincident occurrence of the pulse condition on each of those control input wires which, in respect of the call concerned, have their conditions varied in correspondence with pulses on pulse supply input wires such as $PW_1$ or $PW_n$. The control input wires of the gate G5 which, in respect of a call, have their conditions varied in correspondence with pulses on pulse supply input wires are $r$ in number. The pulse supply input wires such as $PW_1$ and $PW_n$ are connected to corresponding output wires of the pulse generator serving the time-division-multiplex switching system concerned. The output wires are multiplied over the slave selectors. The pulses which the pulse generator produces on the pulse supply input wires are of substantially rectangular waveform. The pulse generator is arranged so that in each channel time period of the time-division-multiplex system concerned, a pulse condition exists on $r$, and only $r$, of the $n$ pulse supply input wires, the combination of $r$ pulse supply input wires involved being different for each channel.

The voltage waveforms required to be produced by the pulse generator just referred to in a specific case where $r$ is equal to 4 and $n$ is equal to 9 are illustrated in Fig. 7. In the case of each waveform shown, the continuous horizontal line represents a datum voltage and the pulses are positive pulses above this line. Each waveform is given the same designation as the corresponding pulse supply input wire of Fig. 6. The time base is marked to indicate channels. Since the specific case to which Fig. 7 pertains is one where there are nine connecting wires $SW_1$, $SW_2$, ..., $SW_9$ (Fig. 6), and where these wires are, for signalling purposes, taken four at a time, the total number of channels provided for, so far as unique code signals and corresponding unique possible combinations of conditions on the wires such as $KD_1$ (Fig. 6) are concerned, is 126. For the sake of simplicity, each of the basic pulses, such as X, in Fig. 7 is shown as extending over the full corresponding channel time period, but in practice each such pulse is arranged to have a duration rather less than the full channel time period. For example, the pulses may have a duration of approximately 0.5 microsecond and the full channel time period may be approximately 0.8 microsecond.

Referring again to Fig. 6, the slave selector to which this figure pertains includes a guarding trigger circuit T5, an isolating gate G6, and an end element E2 which correspond to the elements T4, G4, and E1 respectively of the slave selector of Fig. 3.

When the slave selector of Fig. 6 is at normal, and is required to perform its function in respect of a call, the holding and engaging tone signal condition appears on its holding wire 32, and the associated master selector applies the marking potential to a combination of the wires $SW_1$ to $SW_n$ to indicate the channel to be selected. Where the master selector of Fig. 1 is used in association with the slave selector of Fig. 6, the pulse supply input wire $P_1$ of the master selector is connected to the same output wire of the pulse generator as the pulse supply input wire $PW_1$ of the slave selector, the wire $P_2$ of the master selector is connected to the same output wire of the pulse generator as the pulse supply input wire $PW_2$ of the slave selector, and so on. As previously explained the master selector in this case does not include the wire $SW_0$ and the elements individual to this wire, and therefore includes no pulse supply input wire $P_0$. In the absence of the holding and engaging tone signal condition on the holding wire 32, the output gate G5 is inhibited from producing an output pulse, and the switching trigger circuits such as $TC_1$ and the guarding trigger circuit T5 are maintained in their "off" conditions. Upon the appearance of the holding and engaging tone signal condition on the wire 32, the slave selector is enabled to respond to the code signal given by the master selector over the wires $SW_1$ to $SW_n$. In the case of each of these wires to which the marking potential is applied for the purpose of giving this code signal, a setting condition appears on the setting input wire (such as $KE_1$) of the corersponding switching trigger circuit (such as $TC_1$), with the result that this trigger circuit is set to its "on" condition. Subsequent to such setting the No. of the channel concerned is represented in code by the pattern of the "on" and "off" switching trigger circuits. The pulses supplies to the switching gates (such as $GD_1$ and $GD_n$) are such that no matter what code signal (from among the code signals obtained by marking the $n$ wires $SW_1$ to $SW_n$ $r$ at a time) is given by the master selector, the coincident occurrence of the pulse condition on each of the relevant $r$ of the $n$ leads such as $KD_1$ happens in only one channel time period of the time-division-multiplex cycle. Thus the output gate G5 produces only one output pulse in each complete time-division-multiplex cycle, this output pulse occurring in the channel time period pertaining to the channel the number of which is represented in code by the pattern of the "on" and "off" switching trigger cirtiuts. For example, in the specific case to which Fig. 7 applies (where $r$ is equal to 4 and $n$ is equal to 9), if the master selector applies the marking potential to wires $SW_1$, $SW_3$, $SW_7$, and $SW_9$, but not to wires $SW_2$, $SW_4$, $SW_5$, $SW_6$, and $SW_8$, the switching trigger circuits set to the "on" condition are $TC_1$, $TC_3$, $TC_7$, and $TC_9$. The output gate G5 thus receives pulses corresponding to those appearing on the pulse supply input wires $PW_1$, $PW_3$, $PW_7$, and $PW_9$. As will be clear from Fig. 7, the only channel time period in each time-division-multiplex cycle in which a pulse condition obtains on all of these four wires is the channel time period pertaining to channel No. 35. Thus as long as the pattern of the "on" and "off" switching trigger circuits remains unchanged, and the holding and engaging tone signal condition persists on the wire 32, in each channel time period pertaining to channl No. 35 the output gate G5 produces an output pulse on the wire 31 and the amplifier AMP2 applies a corresponding amplified pulse to the output pulse highway 30.

Referring now to Fig. 8, this as has already been stated is a circuit diagram illustrating suitable detailed circuit arrangements for constituting a slave selector according to Fig. 6. This circuit diagram is drawn and designated for the specific case where $n$ of Fig. 6 is equal to 9, and $r$ is equal to 4, and to which Fig. 7 applies. The amplifier AMP2 linking the wire 31 to the output pulse highway 30 is merely represented schematically in the circuit diagram. It may be of any suitable known type. Of the group of nine connecting wires incoming from the master selector, only the first $SW_1$ and the last $SW_9$ are shown. Of these elements of the slave selector which are individual to the individual connecting wires such as $SW_1$ and $SW_9$, only the elements associated with the wires $SW_1$ and $SW_9$ are shown. The circuit arrangements in many respects resemble those of Fig. 5, and a detailed description of the constitution of the various circuit elements is therefore unnecessary. The pair of wires 32A can be looked upon as corresponding to the holding wire 32 of Fig. 6, and the wires 32B, 32C, and 32D can be looked upon as corresponding to branches of the holding wire 32 of Fig. 6.

During periods in which the slave selector of Fig. 8 is not in use, the holding and engaging tone signal condition is not received over the wires 32A, and the potentials of the wires 32B and 32D are not materially different from earth and, since the resistance of the resistor R38 is low compared with that of the resistor R39, the potential of the wire 32C is only slightly above earth. In these circumstances, all the rectifiers such as MRD$_1$ and MRD$_9$, and also the rectifier MR25, are biased to the non-conducting condition, and current flow through the rectifier MR24 holds the output wire 31 of the output gate G5 at a potential only slightly above earth. Further, in these circumstances the valves VB$_1$ to VB$_9$ and the valve V11 are all maintained in the non-conducting condition. When the slave selector is taken into use for a call, and the holding and engaging tone signal condition appears on the wires 32A and the associated master selector applies the marking potential to a combination of the connecting wires SW$_1$ to SW$_9$, each of the valves VB$_1$ to VB$_9$ which has its associated connecting wire marked is fired. This firing occurs, in the case of each of the four valves concerned, by reason of the facts that the potential of the trigger electrode of the valve is raised by the marking of the relevant connecting wire, and that the potential of the wire 32B is lowered by the voltage produced from the holding and engaging tone by a rectifying combination comprising a transformer TR3, a rectifier MR22, and a capacitor C15. This firing constitutes, of course, in the case of each valve concerned, the setting of the relevant trigger circuit to the "on" condition. What happens in regard to each of the valves VB$_1$ to VB$_9$ which is not so fired, and what happens in regard to each of these valves which is so fired, will now be made clear by way of example by assuming that the valve VB$_1$ is not fired but the valve VB$_9$ is fired. Assuming, then, that the valve VB$_1$ is not fired, the rectifier MRD$_1$ remains biased to the non-conducting condition by reason of its connection to positive battery over the resistor 5RD$_1$. Assuming that the valve VB$_9$ is fired, the current flow through it causes the connection of the rectifier MRD$_9$ to positive battery over the resistor 5RD$_9$ to suffice no longer to maintain this rectifier in the non-conducting condition. Each pulse appearing on the pulse supply input wire PW$_9$ does however serve to bias the rectifier MRD$_9$ to the non-conducting condition for the duration of the pulse. Upon the appearance of the holding and engaging tone signal condition on the wires 32A, the potential of the wire 32C is raised considerably by the voltage produced from the tone by a rectifying combination comprising the transformer TR3, a rectifier MR23, and a capacitor C16. As the result of this raising of the potential of the wire 32C, the rectifier MR24 is biased to the non-conducting condition. It will be clear from what has just been said that, when the slave selector has been taken into use and has responded to the code signal given by the master selector, the conditions in the slave selector circuit are as follows. Each rectifier (such as MRD$_9$ in the example taken) which is individual to a switching gate which is associated with a switching trigger circuit in the "on" condition is conducting except for that portion of the time-division-multiplex cycle in which a pulse condition exists on the pulse supply input wire connected to this switching gate. All the remaining rectifiers individual to switching gates remain biased to the non-conducting condition throughout the time-division-multiplex cycle, and so also does the rectifier MR24. Thus in that particular channel time period which is signified by the code signal given by the master selector the condition obtains that none of the rectifiers MRD$_1$ to MRD$_9$ and MR24 is conducting, with the result that for the duration of this particular channel time period the potential of the wire 31 rises by reason of the connection to positive battery over the resistor R39. The pulse produced in this way on the wire 31 is amplified by the amplifier AMP2 and fed to the output pulse highway 30. During the channel time periods in which one or more of the rectifiers of the switching gates is or are conducting, the wire 31 is held at earth potential by current flow through the rectifier MR25.

The slave selector includes guarding arrangements which comprise the transformer TR3, a rectifier MR26, a capacitor C17, a cold-cathode gas-filled valve V11, resistors R40 and R41, resistors such as 1RD$_1$, 1RD$_9$, 2RD$_1$, 2RD$_9$, 4RD$_1$, and 4RD$_9$, and capacitors such as 1CD$_1$ and 1CD$_9$. These guarding arrangements are on similar lines to the guarding arrangements incorporated in the slave selector of Fig. 5 and already described.

Referring now to Fig. 9, this as has already been stated is a block schematic diagram of a pulse generator which is suitable for use in association with the slave selector of Fig. 8 and which is arranged to produce the waveforms illustrated in Fig. 7. This pulse generator has nine output terminals W$_1$, W$_2$, . . . , and W$_9$ to which are connected the output wires PW$_1$, PW$_2$, . . ., and PW$_9$ respectively. It has, of course, in order to fulfill the requirements, to produce in turn, in accordance with Fig. 7, the 126 possible combinations of four simultaneous pulses on the nine output wires PW$_1$ to PW$_9$. The pulse generator includes a source or generator K of basic pulses one of which occurs in each time position pertaining to each channel of the time-division-multiplex system concerned. These pulses, currently termed "clock" pulses, may conveniently have a recurrence frequency of 1260 kilocycles per second, each being of approximately 0.5 microsecond duration. This means that the pulses are separated by spacing intervals each of approximately 0.3 microsecond duration, and gives a full channel time period of approximately 0.8 microsecond. It also means that a complete cycle of the time-division-multiplex system occupies 100 microseconds. The pulse generator, in addition to the clock pulse generator K, includes electronic switching means arranged to bring about the successive application of all possible combinations of four simultaneous pulses over the nine wires PW$_1$ to PW$_9$. The output of the clock pulse generator is fed over four parallel paths 33 to four electronic pulse distributors A, B, C, and D. Each distributor has six output terminals, the output terminals of distributor A being numbered A$_1$ to A$_6$, and the output terminals of distributors B, C, and D being similarly numbered B$_1$ to B$_6$, C$_1$ to C$_6$, and D$_1$ to D$_6$. These distributor output terminals are connected to the nine output terminals W$_1$ to W$_9$ of the pulse generator in accordance with the system of connections indicated in the following table, in which the designations in the same horizontal row are to be taken as indicating terminals connected together:

| Pulse Generator Terminals | Distributor Terminals | | | |
|---|---|---|---|---|
| W$_1$ | A$_1$ | | | |
| W$_2$ | A$_2$ | B$_1$ | | |
| W$_3$ | A$_3$ | B$_2$ | C$_1$ | |
| W$_4$ | A$_4$ | B$_3$ | C$_2$ | D$_1$ |
| W$_5$ | A$_5$ | B$_4$ | C$_3$ | D$_2$ |
| W$_6$ | A$_6$ | B$_5$ | C$_4$ | D$_3$ |
| W$_7$ | | B$_6$ | C$_5$ | D$_4$ |
| W$_8$ | | | C$_6$ | D$_5$ |
| W$_9$ | | | | D$_6$ |

At the commencement of a cycle of the time-division-multiplex, in response to the first pulse received from the clock pulse generator K each of the four distributors applies a pulse to its first output terminal (A$_1$ or B$_1$ or C$_1$ or D$_1$) to produce the first of the 126 possible combinations of four simultaneous pulses on the nine output terminals W$_1$ to W$_9$, namely the combination of four simultaneous pulses on the terminals W$_1$, W$_2$, W$_3$, and W$_4$. In response to the next five pulses received from the generator K, the distributors A, B, and C continue to apply pulses to their first output terminals, and the distributor D applies pulses successively to its terminals D$_2$, D$_3$, D$_4$, D$_5$, and D$_6$ to produce a further five of the 126 possible combinations, the combinations concerned being four simultaneous pulses on the terminals $W_1$, $W_2$, $W_3$, and $W_5$, four simultaneous pulses on the terminals $W_1$, $W_2$, $W_3$, and $W_6$, four simultaneous pulses on the terminals $W_1$, $W_2$, $W_3$, and $W_7$, four simultaneous pulses on the terminals $W_1$, $W_2$, $W_3$, and $W_8$, and four simultaneous pulses on the terminals $W_1$, $W_2$, $W_3$, and $W_9$. After, and as a consequence of, the application by the distributor D of a pulse to its output terminal $D_6$, the output of the distributor C is switched from the first output terminal to the second output terminal $C_2$. Also, circuit changes are brought about within the distributor D so that its next cycle of pulse outputs is caused to start from the output terminal $D_2$ instead of from the terminal $D_1$. Thus, in response to the seventh pulse received from the generator K, simultaneous pulses appear at the terminals $A_1$, $B_1$, $C_2$, and $D_2$ to produce the seventh of the 126 possible combinations referred to, namely the combination of four simultaneous pulses on the terminals $W_1$, $W_2$, $W_4$, and $W_5$. In response to the next four pulses received from the generator K, the distributors A and B continue to apply pulses to their first output terminals $A_1$ and $B_1$, the distributor C continues to apply pulses to its second output terminal $C_2$, and the distributor D applies pulses successively to its terminals $D_3$, $D_4$, $D_5$, and $D_6$ to produce a further four of the 126 possible combinations. Further possible combinations of four simultaneous pulses on the nine output terminals $W_1$ to $W_9$ are produced in a similar manner. After, and as a consequence of, each succeeding application by the distributor D of a pulse to its output terminal $D_6$ in cases where no pulse is simultaneously applied to the terminal $C_6$, the output of the distributor C is switched to the next higher-numbered terminal, and the next cycle of pulse outputs from the distributor D is caused to start from the correspondingly-numbered one of the output terminals of the last-mentioned distributor. Thus, in response to the twelfth pulse received from the generator K, simultaneous pulses appear at the terminals $A_1$, $B_1$, $C_3$, and $D_3$ to produce the twelfth of the 126 possible combinations referred to, namely the combination of four simultaneous pulses on the terminals $W_1$, $W_2$, $W_5$, and $W_6$. After, and as a consequence of, each occurrence of simultaneous pulse outputs at the terminals $C_6$ and $D_6$ in cases where no pulse is simultaneously applied to the terminal $B_6$ the output of the distributor B is switched to the next higher-numbered terminal, and the next cycles of pulse outputs from the distributors C and D are caused to start from the correspondingly-numbered output terminals of these distributors. After, and as a consequence of, each occurrence of simultaneous pulse outputs at the terminals $B_6$, $C_6$, and $D_6$, the output from the distributor A is switched to the next higher-numbered terminals, and the next cycles of pulse outputs from the distributors B, C, and D are caused to start from the correspondingly-numbered output terminals of these distributors. Finally, the condition is attained in which, in response to the 126th pulse received from the generator K, simultaneous pulses appear at the terminals $A_6$, $B_6$, $C_6$, and $D_6$ to produce the 126th of the 126 possible combinations referred to, namely the combination of four simultaneous pulses on the terminals $W_6$, $W_7$, $W_8$, and $W_9$. After this, of course, a further cycle of the time-division-multiplex commences. With the output terminals of the distributors connected to the terminals $W_1$ to $W_9$ (and therefore to the respective wires $PW_1$ to $PW_9$) in accordance with the table previously given, the system of pulse distribution just set forth operates to fulfill the requirements, namely to produce in turn, in accordance with Fig. 7, the 126 possible combinations of four simultaneous pulses on the nine wires $PW_1$ to $PW_9$. The following table, showing the distributor output terminals at which pulses appear in response to certain of the 126 pulses received from the generator K in a full cycle of the time-division-multiplex, will serve to make clearer the system of pulse distribution employed:

| Pulse from Generator K | Distributor Terminals at which Corresponding Pulses Appear | | | |
|---|---|---|---|---|
| 1st | $A_1$ | $B_1$ | $C_1$ | $D_1$ |
| 2nd | $A_1$ | $B_1$ | $C_1$ | $D_2$ |
| 3rd | $A_1$ | $B_1$ | $C_1$ | $D_3$ |
| 4th | $A_1$ | $B_1$ | $C_1$ | $D_4$ |
| 5th | $A_1$ | $B_1$ | $C_1$ | $D_5$ |
| 6th | $A_1$ | $B_1$ | $C_1$ | $D_6$ |
| 7th | $A_1$ | $B_1$ | $C_2$ | $D_2$ |
| 8th | $A_1$ | $B_1$ | $C_2$ | $D_3$ |
| 11th | $A_1$ | $B_1$ | $C_2$ | $D_6$ |
| 12th | $A_1$ | $B_1$ | $C_3$ | $D_3$ |
| 13th | $A_1$ | $B_1$ | $C_3$ | $D_4$ |
| 21st | $A_1$ | $B_1$ | $C_6$ | $D_6$ |
| 22nd | $A_1$ | $B_2$ | $C_2$ | $D_2$ |
| 23rd | $A_1$ | $B_2$ | $C_2$ | $D_3$ |
| 26th | $A_1$ | $B_2$ | $C_2$ | $D_6$ |
| 27th | $A_1$ | $B_2$ | $C_3$ | $D_3$ |
| 28th | $A_1$ | $B_2$ | $C_3$ | $D_4$ |
| 36th | $A_1$ | $B_2$ | $C_6$ | $D_6$ |
| 37th | $A_1$ | $B_3$ | $C_3$ | $D_3$ |
| 38th | $A_1$ | $B_3$ | $C_3$ | $D_4$ |
| 55th | $A_1$ | $B_5$ | $C_6$ | $D_6$ |
| 56th | $A_1$ | $B_6$ | $C_6$ | $D_6$ |
| 57th | $A_2$ | $B_2$ | $C_2$ | $D_2$ |
| 58th | $A_2$ | $B_2$ | $C_2$ | $D_3$ |
| 90th | $A_2$ | $B_5$ | $C_6$ | $D_6$ |
| 91st | $A_2$ | $B_6$ | $C_6$ | $D_6$ |
| 92nd | $A_3$ | $B_3$ | $C_3$ | $D_3$ |
| 93rd | $A_3$ | $B_3$ | $C_3$ | $D_4$ |
| 124th | $A_5$ | $B_5$ | $C_6$ | $D_6$ |
| 125th | $A_5$ | $B_6$ | $C_6$ | $D_6$ |
| 126th | $A_6$ | $B_6$ | $C_6$ | $D_6$ |

Referring now to Fig. 10, this is a schematic diagram of the distributor D of the pulse generator of Fig. 9, and is of the so-called functional type. The six terminals designated $D_1$ to $D_6$ are the output terminals of the distributor, and correspond to the terminals $D_1$ to $D_6$ of Fig. 9. The wire 33 corresponds to the wire 33 of Fig. 9, and receives a continuous succession of pulses from the clock pulse generator K. The wire LDC is an outgoing control wire to the distributor C, and the wires LCD1, LCD2, LCD3, LCD4, and LCD5 are incoming control wires from the distributor C. Within the distributor D, the wire 33 is linked to the six output terminals $D_1$ to $D_6$ by paths including five output gates OG1D, OG2D, OG3D, OG4D, and OG5D, and five control gates CG1D, CG2D, CG3D, CG4D, and CG5D. The output gates OG1D to OG5D are normally closed to block the passage of pulses and the control gates CG1D to CG5D are normally open. The output gates and the control gates are arranged to be controlled in pairs, each pair including a control gate and the correspondingly-numbered output gate. For the control of the pairs of gates the distributor includes five trigger circuits ZD1, ZD2, ZD3, ZD4, and ZD5. On being set to its "on" condition, each of these trigger circuits brings about the opening of the output gate, and the closing of the control gate, of the particular pair of gates with which it is associated. For the control of the trigger circuits ZD1 to ZD5 the distributor includes six so-called end elements ED1, ED2, ED3, ED4, ED5, and ED6 and five trigger control gates ND1, ND2, ND3, ND4, and ND5. The distributor is arranged so that the first clock pulse received over the wire 33 in a full cycle of the time-division-multiplex passes through the normally-open control gates CG5D, CG4D, CG3D, CG2D, and CG1D to the terminal $D_1$ and to the end element ED1. Upon the termination of the first pulse, the end element ED1 applies a pulse to the setting wire 34 of the trigger circuit ZD1, with the result that this trigger circuit is set to its "on" condition so that the control gate CG1D is closed and the output gate OG1D is opened. The second clock pulse of the cycle accordingly passes through the gates CG5D, CG4D, CG3D, CG2D, and OG1D to the terminal $D_2$ and to the end element ED2. Upon the termination of the second pulse, the end element ED2 brings about, through the medium of the gate ND2, the setting of the trigger circuit ZD2 to its "on" condition, so that the control gate CG2D is closed and the output gate OG2D is opened. The third clock pulse of the cycle accordingly passes to the terminal $D_3$ and to the end element ED3. In a corresponding manner, the fourth, fifth, and sixth clock pulses of the cycle are caused to pass to the terminals $D_4$, $D_5$, and $D_6$ respectively and to the end elements ED4, ED5, and ED6 respectively. Upon the termination of the sixth pulse, the end element ED6 applies a pulse to the resetting wires (such as the wire 35) of all the trigger circuits ZD1 to ZD5 and to the outgoing control wire LDC. As the result of this, the trigger circuits ZD1 to ZD5 are reset to their "off" conditions and changes of condition take place in the distributor C of the pulse generator. The relevant changes of condition in the distributor C will be described later with reference to Fig. 11. As a result of the last-mentioned changes, the distributor C applies a setting condition to the wire LCD1, with the result that the trigger circuit ZD1 is again set to its "on" condition before the seventh clock pulse of the cycle is received at the distributor D over the wire 33. The seventh clock pulse of the cycle accordingly passes through the gates CG5D, CG4D, CG3D, CG2D, and OG1D to the terminal $D_2$. The eighth, ninth, tenth, and eleventh clock pulses of the cycle are caused to pass to the terminals $D_3$, $D_4$, $D_5$, and $D_6$ respectively. Upon the termination of the eleventh pulse, the pulse applied to the wire LDC by the end element ED6 brings about the application of a setting condition to the wire LCD2 by the distributor C. Accordingly, upon the termination of the eleventh pulse all the trigger circuits ZD1 to ZD5 are reset to their "off" conditions and then the trigger circuit ZD2 is again set to its "on" condition. Thus the twelfth, thirteenth, fourteenth, and fifteenth clock pulses of the cycle are caused to pass to the terminals $D_3$, $D_4$, $D_5$, and $D_6$ respectively, and so on.

Referring now to Fig. 11, this is a schematic diagram of the distributor C of the pulse generator of Fig. 9, and is of the so-called functional type. The six terminals designated $C_1$ to $C_6$ are the output terminals, and correspond to the terminals $C_1$ to $C_6$ of Fig. 9. The wire 33 corresponds to the wire 33 of Fig. 9. The wire LDC corresponds to the wire LDC of Fig. 10, and is, so far as the distributor C is concerned, an incoming control wire. The wires LCD1, LCD2, LCD3, LCD4, and LCD5 correspond to the wires similarly designated in Fig. 10, and are, so far as the distributor C is concerned, outgoing control wires. The wire LCB is an outgoing control wire to the distributor B, and the wires LBC1, LBC2, LBC3, LBC4, and LBC5 are incoming control wires from the distributor B. Like the distributor D, the distributor has output gates and control gates arranged to be controlled in pairs, there being five output gates OG1C, OG2C, OG3C, OG4C, and OG5C, and five control gates CG1C, CG2C, CG3C, CG4C, and CG5C. For the control of the pairs of gates the distributor includes five trigger circuits ZC1, ZC2, ZC3, ZC4, and ZC5. For the control of the trigger circuits ZC1 to ZC5 the distributor includes four slow-to-operate elements SC1, SC2, SC3, and SC4, and ten trigger control gates MC1, MC2, MC3, MC4, NC1, NC2, NC3, NC4, NC5, and XC. The first six clock pulses received over the wire 33 in a full cycle of the time-division multiplex pass through the normally-open control gates CG5C, CG4C, CG3C, CG2C, and CG1C to the terminal $C_1$. When, upon the termination of the sixth pulse, the distributor D applies a pulse to the wire LDC, this pulse passes through the normally-open trigger control gate XC and reaches the setting wire 36 of the trigger circuit ZC1. Accordingly, the trigger circuit ZC1 is set to its "on" condition and brings about the closing of the control gate CG1C, and the opening of the output gate OG1C, and the application, as referred to in connection with Fig. 10, of the setting condition to the wire LCD1. On being set to its "on" condition, the trigger circuit ZC1 also brings about the opening of the trigger control gate MC1 so that upon the receipt of the next pulse over the wire LDC the trigger circuit ZC2 is set to its "on" condition. The lag due to the slow-to-operate element SC1 is sufficient to ensure that this opening of the gate MC1 does not take place until after the termination of the pulse which has set the trigger circuit ZC1. The seventh, eighth, ninth, tenth, and eleventh clock pulses of the cycle pass through the gates CG5C, CG4C, CG3C, CG2C, and OG1C to the terminal $C_2$. When, upon the termination of the eleventh pulse, the distributor D again applies a pulse to the wire LDC this pulse passes through the gate MC1 with the result that the trigger circuit ZC2 is set to its "on" condition. On being set to its "on" condition, the trigger circuit ZC2 brings about the closing of the control gate CG2C, and the opening of the output gate OG2C, and the application, as referred to in connection with Fig. 10, of the setting condition to the wire LCD2, and the opening of the trigger control gate MC2. The lag due to the slow-to-operate element SC2 is sufficient to ensure that the opening of the gate MC2 does not take place until after the termination of the pulse which has set the trigger circuit ZC2. The twelfth, thirteenth, fourteenth, and fifteenth clock pulses of the cycle pass through the gates CG5C, CG4C, CG3C, and OG2C to the terminal $C_3$. In a corresponding manner, the sixteenth, seventeenth, and eighteenth clock pulses of the cycle are caused to pass to the terminal $C_4$, and the nineteenth and twentieth are caused to pass to the terminal $C_5$, and the twenty-first is caused to pass to the terminal $C_6$. Upon the termination of the twenty-first pulse, the end element EC applies a pulse to the resetting wires (such as the wire 37) of all the trigger circuits ZC1 to ZC5 and to the inhibiting input wire of the gate XC, and to the outgoing control wire LCB. As the result of this, the trigger circuits ZC1 to ZC5 are reset to their "off" conditions, and the gate XC renders ineffective (as regards the distributor C) the pulse produced at this time by the end element ED6 (Fig. 10), and changes of condition take place in the distributor B of the pulse generator. As a result of the last-mentioned changes, the distributor B applies a setting condition to the wire LBC1, with the result that the trigger circuit ZC1 is again set to its "on" condition before the twenty-second clock pulse of the cycle is received at the distributor C over the wire 33. The twenty-second to twenty-sixth pulses of the cycle accordingly pass through the gates CG5C, CG4C, CG3C, CG2C, and OG1C to the terminal $C_2$, and so on.

The distributor B of the pulse generator of Fig. 9 is constituted similarly to the distributor C, and so also is the distributor A except that it has no incoming control wires corresponding to the wires LBC1 to LBC5 and has no trigger control gates corresponding to the gates NC1 to NC5. When, upon the termination of the twenty-first clock pulse received over the wire 33 in a full cycle of the time-division-multiplex, the distributor C applies a pulse to the control wire LCB outgoing to the distributor B, this pulse causes the clock pulse path in the distributor B to be switched from the terminal $B_1$ to the terminal $B_2$ in precisely the same way as the clock pulse path in the distributor C is switched from the terminal $C_1$ to the terminal $C_2$ upon the termination of the sixth pulse of the cycle. The process continues, the distributor B being set to a more advanced condition on the termination of each pulse which appears at the terminal $C_6$, and the distributor A being similarly set to a more advanced condition on the termination of each pulse which appears at the terminal $B_6$, until the last (126th) pulse of the cycle appears at the terminals $A_6$, $B_6$, $C_6$, and $D_6$. On the termination of this last pulse, the pulses from the end elements (such as ED6, Fig. 10, and EC, Fig. 11) associated with the terminals $A_6$, $B_6$, $C_6$, and $D_6$ bring about the restoration of all the trigger circuits in the four distributors to normal and the pulse generator is ready to commence a fresh cycle of operation.

Referring now to Figs. 12A and 12B, these when placed side by side with Fig. 12B to the right of Fig. 12A together constitute a circuit diagram illustrating suitable detailed circuit arrangements for constituting the distributor D (Figs. 9 and 10). These circuit arrangements have an input terminal 38 to which the wire 33 (Figs. 9 and 10) is connected and an output terminal 39 to which the wire LDC (Fig. 10) is connected. The six terminals designated $D_1$ to $D_6$ are output terminals corresponding to the terminals $D_1$ to $D_6$ of Figs. 9 and 10. The five terminals 41, 42, 43, 44, and 45 are input terminals to which are connected the wires LCD1, LCD2, LCD3, LCD4, and LCD5 (Fig. 10) respectively. The control gate CG1D (Fig. 10) is constituted by two rectifiers MD1E and MD1F, two resistors RD1L and RD1M, and a capacitor CD1G, the control gate CG2D is constituted by two rectifiers MD2E and MD2F, two resistors RD2L and RD2M, and a capacitor CD2G, and the control gates CG3D, CG4D, and CG5D are similarly constituted. The output wire 51 of the control gate CG1D is associated with the output terminal $D_1$ through the medium of a two-stage amplifier including two triodes VD1J and VD1K, a coupling transformer TRD1G, and an output transformer TRD1H. The output wire 52 of the control gate CG2D is associated with the input wire 61 of the control gate CG1D and the output gate OG1D (Fig. 10) through the medium of a single-stage amplifier comprising a triode VD2J and a cathode circuit resistor RD2R, and the output wire 53 of the control gate CG3D is associated with the input wire 62 of the control gate CG2D and the output gate OG2D through the medium of a single-stage amplifier comprising a triode VD3J and a cathode circuit resistor RD3R, and so on. The output gate OG1D is constituted by two rectifiers MD1G and MD1H, two resistors RD1N and RD1P, and a capacitor CD1H, the output gate OG2D is constituted by two rectifiers MD2G and MD2H, two resistors RD2N and RD2P, and a capacitor CD2H, and so on. The output wire 71 of the output gate OG1D is associated with the output terminal $D_2$ through the medium of a two-stage amplifier including two triodes VD1G and VD1H, a coupling transformer TRD1E, and an output transformer TRD1F, and the output wire 72 of the output gate OG2D is associated with the output terminal $D_3$ through the medium of a two-stage amplifier including two triodes VD2G and VD2H, a coupling transformer TRD2E, and an ouput transformer TRD2F, and so on. The terminal 38 is directly connected to the input wire 65 of the control gate CG5D and the output gate OG5D. The trigger circuit ZD1 (Fig. 10) is constituted by two triodes VD1E and VD1F, a resetting circuit input rectifier MD1J, six resistors RD1E, RD1F, RD1G, RD1H, RD1J, and RD1K, and two capacitors CD1E and CD1F. Each of the remaining four trigger circuits of the distributor D is similarly constituted, the trigger circuit ZD2 including two triodes VD2E and VD2F, and the trigger circuit ZD3 including two triodes VD3E and VD3F, and so on. The two valves of each of the trigger circuits ZD1 to ZD5 are connected to constitute a bi-stable trigger arragement. The end element ED1 (Fig. 10) is constituted by a capacitor CD1J and a resistor RD1Q, the end element ED2 is constituted by a capacitor CD2J and a resistor RD2Q, and so on up to and including the end element ED5. The end element ED6 (Fig. 10) includes a capacitor CD6J and a resistor RD6Q corresponding to the capacitors and resistors of the end elements ED1 to ED5, but it also includes two triodes VD6L and VD6M, a transformer TRD6J, a capacitor CD6K, and two resistors RD6S and RD6T. The trigger control gate ND1 (Fig. 10) is constituted by two rectifiers MD1JL and MD1K (operating in association with the resistors RD1E, RD1J, and RD1K), the trigger control gate ND2 is constituted by two rectifiers MD2J and MD2K, and so on.

The condition of the circuit arrangements of Figs. 12A and 12B immediately prior to the receipt over the wire 33 of the first clock pulse in a full cycle of the time-division multiplex is that none of the trigger circuits ZD1 to ZD5 is in the "on" condition. In these circumstances, each valve such as VD1E and VD2E is conducting, and each valve such as VD1F and VD2F is biased to the anode current cut-off condition. With the valve VD5E of the trigger circuit ZD5 conducting, and the valve VD5F not conducting, and no pulse on the wire 33, the conditions in the control gate CG5D and the output gate OG5D are as follows. In the control gate CG5D, current flows from 100 volts positive through the rectifiers MD5F and MD5E and the resistor RD5L to 150 volts negative (so that the potential of the grid of the valve VD5J is held at about 100 volts positive), and the controlling voltage applied (from the anode circuit of the valve VD5F) to the resistor RD5M is 150 volts positive. In the output gate OG5D, current flows from 100 volts positive through the rectifiers MD5H and MD5G and the resistor RD5N to 150 volts negative (so that the potential of the grid of the valve VD5G is held at about 100 volts positive), and the controlling voltage applied (from the anode circuit of the valve VD5E) to the resistor RD5P is lower than 100 volts positve (since the valve VD5E is conducting). The clock pulses received over the wire 33 are positive pulses. Upon the occurrence of the first clock pulse in a full cycle of the time-division multiplex, the application of the pulse, through the capacitor CD5G, to the junction of the resistor RD5L and the rectifier MD5E suffices to cause this rectifier to be biased to the non-conducting condition for the duration of the pulse. Since, in the circumstances prevailing at this time, the controlling voltage applied to the resistor RD5M is 150 volts positive, the rectifier MD5F is also biased to the non-conducting condition for the duration of the pulse. Accordingly, the clock pulse gives rise to a corresponding positive pulse on the wire 55, which is repeated by the amplifying valve VD5J to the input wire 64 of the control gate CG4D. In other words, the control gate CG5D functions as an open gate in regard to the pulse. Still referring to what happens upon the occurrence of the first clock pulse in a full cycle of the time-division multiplex, the application of the pulse, through the capacitor CD5H, to the junction of the resistor RD5N and the rectifier MD5G suffices to cause this rectifier to be biased to the non-conducting condition for the duration of the pulse. Since, however, the controlling voltage applied to the resistor RD5P at this time is lower than 100 volts positive, the rectifier MD5H remains conducting throughout the pulse with the result that no material rise of the potential of the wire 75 takes place in response to the pulse. In other words, the output gate OG5D functions as a closed gate in regard to the pulse. The positive pulse produced on the wire 64 is repeated, as will be clear from the description already given, though the open control gates CG4D, CG3D, CG2D, and CG1D, and the amplifiers associated with these gates, to the output terminal $D_1$. Upon the termination of the first clock pulse in a full cycle of the time-division multiplex, the end element ED1 (constituted by the resistor-capacitor combination RD1Q and CD1J which has a very short time constant) produces on the input wire 81 of the trigger control gate ND1 a brief positive pulse which suffices to trigger the trigger circuit ZD1 to its "on" condition. With the trigger circuit ZD1 in its "on" condition, the valve VD1E is not conducting and the valve VD1F is conducting, the controlling voltage applied (from the anode circuit of the valve VD1F) to the resistor RD1M is lower than 100 volts positive, and the controlling voltage applied (from the anode circuit of the valve VD1E) to the resistor RD1P is 150 volts positive. Upon the occurrence of the second clock pulse in a full cycle of the time-division multiplex, the positive pulse on the wire 33 is repeated through the open control gates CG4D, CG3D, and CG2D, and the amplifiers associated with these gates, to the input wire 61 of the control gate CG1D and the output gate OG1D. The application, through the capacitor CD1G, of the pulse on the wire 61 to the junction of the resistor RD1L and the rectifier MD1E suffices, as it does in the case of the first clock pulse in a full cycle, to cause this rectifier to be biased to the non-conducting condition for the duration of the pulse. Since, however, in the circumstances now being considered the controlling voltage applied to the resistor RD1M is lower than 100 volts positive, the rectifier MD1F remains conducting throughout the pulse with the result that no material rise of the potential of the wire 51 takes place in response to the pulse. In other words, the control gate CG1D functions as a closed gate in regard to the second clock pulse in a full cycle. Still referring to what happens upon the occurrence of the second clock pulse in a full cycle of the time-division multiplex, the application, through the capacitor CD1H, of the pulse on the wire 61 to the junction of the resistor RD1N and the rectifier MD1G suffices to cause this rectifier to be biased to the non-conducting condition for the duration of the pulse. Since the controlling voltage applied to the resistor RD1P at this time is 150 volts positive, the rectifier MD1H is also biased to the non-conducting condition for the duration of the pulse. Accordingly, the pulse gives rise to a corresponding positive pulse on the wire 71, which is repeated by the amplifying valves VD1G and VD1H to the output terminal $D_2$. In other words, the output gate OG1D functions as an open gate in regard to the second clock pulse in a full cycle. Upon the termination of this clock pulse, the end element ED2 (constituted by the resistor-capacitor combination RD2Q and CD2J) produces on the input wire 82 of the trigger control gate ND2 a brief positive pulse which suffices to trigger the trigger circuit ZD2 to its "on" condition, and so on.

Upon the termination of the sixth clock pulse in a full cycle of the time-division multiplex, the resistor-capacitor combination RD6Q and CD6J produces a brief positive pulse on the wire 86, and thereby causes the arrangement including the valves VD6L and VD6M to produce on the wire 86A a positive pulse of considerably longer duration than this pulse on the wire 86. The valve VD6M is connected to constitute a trigger circuit arranged as a so-called blocking oscillator circuit. Normally, this trigger circuit is in a stable condition in which the valve VD6M is biased to the anode current cut-off condition. The valve VD6L also is normally biased to the anode current cut-off condition. When a brief positive pulse appears on the wire 86 as just mentioned, the valve VD6L passes anode current for a brief period with the result that the potential of the anode of the valve VD6M is lowered for a brief period. This change of potential of the anode of the valve VD6M causes the trigger circuit constituted by the valve VD6M to be triggered to an unstable condition in which a substantial current flows through the cathode resistor RD6T, and in which grid current flows through the resistor RD6S. The flow of current through the resistor RD6T serves to produce the pulse on the wire 86A, and the flow of grid current through the resistor RD6S causes the capacitor CD6K to become charged to an extent which serves to ensure that the valve VD6M cannot conduct for the requisite period. The positive pulse on the wire 86A is applied, through the resetting circuit input rectifiers such as MD1J, to the grids of all the valves VD1E to VD5E, with the result that the trigger circuits ZD1 to ZD5 are reset to their "off" conditions. The positive pulse on the wire 86A is also transmitted to the control wire LDC.

When, as a result of this production of a pulse on the wire LDC, the distributor C applies to the wire LCD1 a setting condition in the form of a positive pulse (as will be described later with reference to Figs. 13A and 13B), this pulse on the wire LCD1 is transmitted through the rectifier MD1K (of the trigger control gate ND1) to the grid of the valve VD1F and suffices to trigger the trigger circuit ZD1 to its "on" condition. Accordingly, the seventh clock pulse in a full cycle of the time-division multiplex is repeated through the control gates CG5D, CG4D, CG3D, and CG2D, and the output gate OG1D, and the amplifiers associated with these gates, to the output terminal $D_2$.

The manner of operation of the distributor D of Figs. 12A and 12B in response to the eighth to 126th clock pulses in a full cycle of the time-division multiplex will be clear from the description already given with reference to these figures and Fig. 10.

Figure 13A:
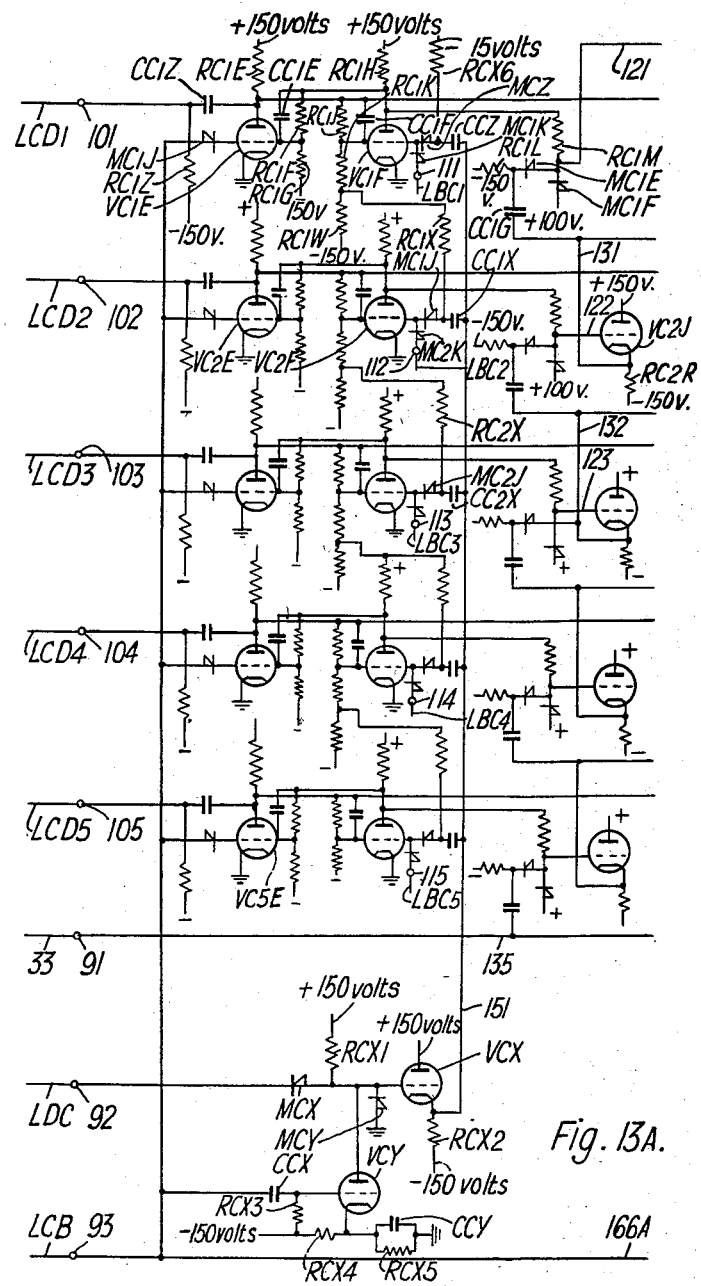
Figure 13B:
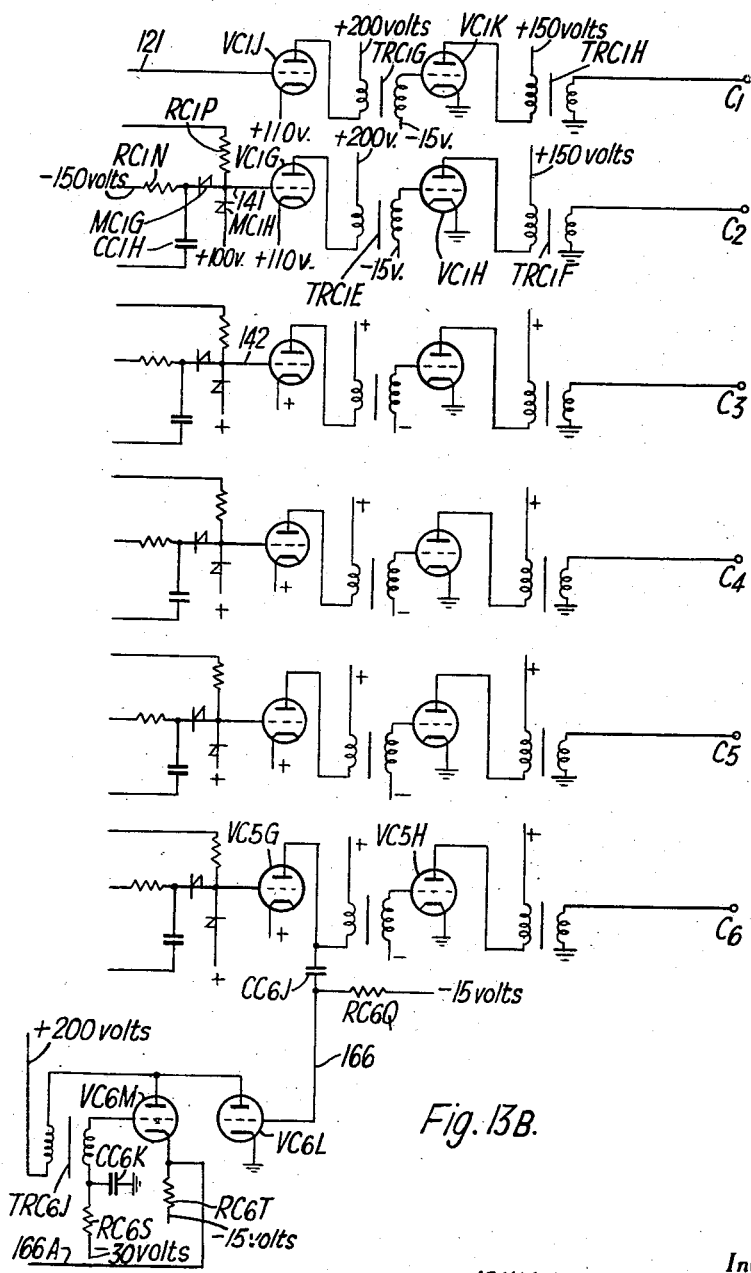

Referring now to Figs. 13A and 13B, these when placed side by side with Fig. 13B to the right of Fig. 13A together constitute a circuit diagram illustrating suitable detailed circuit arrangements for constituting the distributor C (Figs. 9 and 11). These circuit arrangements are similar in many respects to those illustrated in Figs. 12A and 12B, and for this reason the manner of operation of some of the elements of Figs. 13A and 13B will not be described in detail. The circuit arrangements have an input terminal 91 to which the wire 33 (Figs. 9 and 11) is connected, an input terminal 92 to which the wire LDC (Fig. 11) is connected, and an output terminal 93 to which the wire LCB (Fig. 11) is connected. The six terminals designated $C_1$ to $C_6$ are output terminals corresponding to the terminals $C_1$ to $C_6$ of Figs. 9 and 11. The five terminals designated 101, 102, 103, 104, and 105 are output terminals to which are connected the wires LCD1, LCD2, LCD3 LCD4, and LCD5 (Fig. 11) respectively. The five terminals designated 111, 112, 113, 114, and 115 are input terminals to which are connected the wires LBC1, LBC2, LBC3, LBC4, and LBC5 (Fig. 11) respectively. The control gate CG1C (Fig. 11) is constituted by two rectifiers MC1E and MC1F, two resistors RC1L and RC1M, and a capacitor CC1G, and the control gates CG2C, CG3C, CG4C, and CG5C are similarly constituted. The output wire 121 of the control gate CG1C is associated with the output terminal $C_1$ through the medium of a two-stage amplifier including two triodes VC1J and VC1K, a coupling transformer TRC1G, and an output transformer TRC1H. The output wire 122 of the control gate CG2C is associated with the input wire 131 of the control gate CG1C and the output gate OG1C (Fig. 11) through the medium of a single-stage amplifier comprising a triode VC2J and a cathode circuit resistor RC2R, and the output wire 123 of the control gate CG3C is similarly associated with the input wire 132 of the control gate CG2C, and so on. The output gate OG1C is constituted by two rectifiers MC1G and MC1H, two resistors RC1N and RC1P, and a capacitor CC1H, and the output gates OG2C, OG3C, OG4C, and OG5C are similarly constituted. The output wire 141 of the output gate OG1C is associated with the output terminal $C_2$ through the medium of a two-stage amplifier including two triodes VC1G and VC1H, a coupling transformer TRC1E, and an output transformer TRC1F, and the output wire 142 of the output gate OG2C is similarly associated with the output terminal $C_3$, and so on. The terminal 91 is directly connected to the input wire 135 of the control gate CG5C and the output gate OG5C. The trigger circuit ZC1 (Fig. 11) is constituted by two triodes VC1E and VC1F, a resetting circuit input rectifier MC1J, eight resistors RC1E, RC1F, RC1G, RC1H, RC1J, RC1K, RC1W, and RC1Z, and three capacitors CC1E, CC1F, and CC1Z. Each of the remaining four trigger circuits of the distributor C is similarly constituted. The two valves of each of the trigger circuits ZC1 to ZC5 are connected to constitute a bi-stable trigger arrangement. The trigger control gate XC (Fig. 11) is constituted by two triodes VCX and VCY, two rectifiers MCX and MCY, five resistors RCX1, RCX2, RCX3, RCX4, and RCX5, and two capacitors CCX and CCY. The output wire 151 of this gate is coupled to the grid of the valve VC1F by means of a coupling arrangement constituted by a rectifier MCZ, a resistor RCX6, and a capacitor CCZ. The slow-to-operate element SC1 (Fig. 11) and the trigger control gate MC1 (Fig. 11) are combined and constituted by a rectifier MC1J, a resistor RC1X, and a capacitor CC1X, the slow-to-operate element SC2 and the trigger control gate MC2 are combined and constituted by a rectifier MC2J, a resistor RC2X, and a capacitor CC2X, and so on. The trigger control gate NC1 (Fig. 11) is constituted by the rectifier MC1K, the trigger control gate NC2 is constituted by the rectifier MC2K, and so on. The end element EC (Fig. 11) is constituted by two triodes VC6L and VC6M, a transformer TRC6J, two capacitors CC6J and CC6K, and three resistors RC6Q, RC6S, and RC6T.

The condition of the circuit arrangements of Figs. 13A and 13B immediately prior to the receipt over the wire 33 of the first clock pulse in a full cycle of the time-division multiplex is such that none of the trigger circuits ZC1 to ZC5 is in the "on" condition. In these circumstances, each valve such as VC1E and VC2E is conducting, and each valve such as VC1F and VC2F is biased to the anode current cut-off condition. The control gates CG1C to CG5C are open, and the output gates are closed. The first six clock pulses received over the wire 33 in a full cycle of the time-division multiplex are repeated through the control gates and the relevant amplifiers to the terminal C₁. When, upon the termination of the sixth pulse, the distributor D applies a pulse to the wire LDC, this pulse suffices to cause the rectifier MCX to be biased to the non-conducting condition for the duration of the pulse, with the result that the potential of the grid of the valve VCX is raised for the duration of the pulse owing to the connection to 150 volts positive over the resistor RCX1. Accordingly, the positive pulse on the wire LDC is repeated by the amplifying valve VCX to the wire 151. The resutling positive pulse on the wire 151 is transmitted to the grid of the valve VC1F through the capacitor CCZ and the rectifier MCZ, and suffices to trigger the trigger circuit ZC1 to its "on" condition, but does not affect the remaining trigger circuits since the relevant trigger control gates all function as closed gates in regard to the pulse. The reason for this is that, the trigger circuits ZC1 to ZC4 being in the "off" condition, the controlling voltages applied from these circuits to the resistors such as RC1X and RC2X are sufficiently negative to bias the rectifiers such as MC1J and MC2J to the non-conducting condition and to maintain these rectifiers so biased against the effect of the pulse. The pulse suffices to overcome the bias on the rectifier MCZ due to the connection to 15 volts negative over the resistor RCX6. Upon being set to its "on" condition, the trigger circuit ZC1 brings about the closing of the control gate CG1C, and the opening of the output gate OG1C, as will be clear from the figures and from the description already given in connection with similar operations in the distributor D. By reason of the connection over the capacitor CC1Z and the resistor RC1Z, the rise of potential of the anode of the valve VC1E serves to produce on the wire LCD1 a positive pulse constituting the setting condition. The rise of potential of the anode of the valve VC1E also serves to render less negative the controlling voltage applied (from the trigger circuit ZC1) to the resistor RC1X, with the result that the trigger control gate MC1 functions as an open gate in regard to the next positive pulse on the wire 151. The time taken to charge the capacitor CC1X sufficiently to cause its junction with the rectifier MC1J to take up the requisite potential serves to constitute the delay necessary to ensure that this opening of the gate MC1 does not take place until after the termination of the pulse which has triggered the trigger circuit ZC1 to its "on" condition. The seventh, eighth, ninth, tenth, and eleventh clock pulses of the cycle are repeated to the terminal C₂ through the control gates CG5C, CG4C, CG3C, and CG2C, and the output gate OG1C, and the relevant amplifiers. When, upon the termination of the eleventh pulse, the distributor D again applies a pulse to the wire LDC, the resulting positive pulse on the wire 151 passes through the now open trigger control gate MC1 and triggers the trigger circuit ZC2 to its "on" condition, and so on.

Upon the termination of the twenty-first pulse in a full cycle of the time-division multiplex, the resistor-capacitor combination RC6Q and CC6J produces a brief positive pulse on the wire 166, and thereby causes the arrangement including the valves VC6L and VC6M to produce on the wire 166A a positive pulse of considerably longer duration than this pulse on the wire 166. The arrangement including the valves VC6L and VC6M corresponds, in its constitution and manner of operation, to the arrangement including the valves VD6L and VD6M (Fig. 12B). The positive pulse on the wire 166A is applied, through the resetting circuit input rectifiers such as MC1J, to the grids of all the valves VC1E to VC5E, with the result that the trigger circuits ZC1 to ZC5 are reset to their "off" conditions. The positive pulse on the wire 166A serves to render conducting the valve VCY, which is normally biased to the anode current cut-off condition. With the valve VCY rendered conducting as just stated, current flow through the rectifier MCY, the valve VCY, and the resistor RCX4 serves to hold the grid of the valve VCX at about earth potential, so that the gate XC is inhibited. Thus for the duration of the positive pulse on the wire 166A the gate XC is inhibited and renders ineffective (as regards the distributor C) the pulse produced at this time on the wire LDC by the distributor D. In order to ensure that such inhibition of the gate XC is fully effective, it is arranged that the positive pulse on the wire 166A is slightly longer than, and starts slightly earlier than, the pulse on the wire LDC. The slightly earlier start of the pulse on the wire 166A is obtained by deriving the input to the wire 166 from the first of the two valves VC5G and VC5H, whereas the input to the wire 86 (Fig. 12B) is derived from the second of the two valves VD5G and VD5H. The positive pulse on the wire 166A is also transmitted to the control wire LCB. When, as a result of this production of a pulse on the wire LCB, the distributor B applies to the wire LBC1 a setting condition in the form of a positive pulse, this pulse on the wire LBC1 is transmitted through the rectifier MC1K (of the trigger control gate NC1) to the grid of the valve VC1F and suffices to trigger the trigger circuit ZC1 to its "on" condition. Accordingly, the twenty-second clock pulse in a full cycle of the time-division multiplex is repeated through the control gates CG5C, CG4C, CG3C, and CG2C, and the output gate OG1C, and the amplifiers associated with these gates, to the output terminal C₂.

The manner of operation of the distributor C of Figs. 13A and 13B in response to the twenty-third to 126th clock pulses in a full cycle of the time-division multiplex will be clear from the description already given with reference to these figures and Fig. 11.

Referring now to Fig. 14, this block schematic diagram illustrates the constitution of, and shows how the improved master and slave selector arrangements of the present invention find an application in, an electronic selecting switch of a type employed in a known form of exchange switching system of the kind in which connections are set up through a switching rank by means of a time division multiplex transmission system. It must be emphasised that most of the constituent arrangements of an electronic selecting switch which are illustrated in Fig. 14 are not the concern of the present invention, the object of which is to provide economical forms of master and slave selector arrangements adapted for use in apparatus of the nature exemplified by the electronic selecting switch to which the figure pertains. This switch has a plurality of terminal trunks on each side and is capable of providing a plurality of effective through conversational "connections" simultaneously. It is a so-called primary switch, that is, is a switch in a primary rank, and it is arranged to act both as a line finder and as a final selector. The two sides of the switch are called the bank side and the selector side by analogy with electromechanical selecting switches. On its bank side, the switch has a plurality of terminal trunks each comprising a "holding signal" path 204 and two speech paths 205 and 206. Externally of the switch, the plurality of bank-side terminal trunks are connected, each by way of a subscriber's apparatus unit individual to it which is not shown, to a like plurality of subscriber lines. On its selector side, the switch has a plurality of terminal trunks each comprising a "backward mark signal" path 207, two "holding signal" paths 208 and 210, and two speech paths 209 and 211. Externally of the switch, the plurality of selector-side terminal trunks are connected to bank-side terminal trunks of secondary switches which are not shown. For each bank-side terminal trunk of the switch there is, forming part of the switch, a combination consisting of a modulator 201 and a demodulator 202. Each such combination is supplied, by a pulse generator 203, with regularly spaced channel pulses pertaining (as regards their times of occurrence) to the time-division-multiplex communication channel (between the two sides of the switch) allocated to the particular bank-side terminal trunk concerned, there being one such channel (two-way) for each bank-side terminal trunk of the switch. For each selector-side terminal trunk of the switch there is, forming part of the switch, a combination consisting of a modulator 212 and a demodulator 213. Each such combination (and therefore each selector-side terminal trunk of the switch) has individual to it a slave selector 214. Each such slave selector 214 has a setting for each of the time-division-multiplex communication channels between the two sides of the switch, and when set serves for furnishing regularly spaced channel pulses, pertaining to the channel to which it is set, to the associated combination consisting of a modulator 212 and a demodulator 213. For setting the slave selectors of the switch, a single master selector 215 is provided. Pulses for the operation of the slave selectors and master selector are supplied by a pulse generator 239. The time division multiplex transmission system linking the two sides of the switch comprises a pulse highway 216 and a pulse highway 217. The pulse highway 216 includes an amplifier 218 and serves for transmission in one direction, and the pulse highway 217 includes an amplifier 219 and serves for transmission in the other direction. The speech paths of the terminal trunks of the switch are normal audio-frequency (not time division multiplex) circuits. The signal condition applied to a "holding signal" path of a terminal trunk of the switch is a continuous holding and engaging tone having a frequency at the upper end of the audio-frequency range. The holding signals are transmitted between the two sides of the switch by using the signals to control the modulators, each modulator only sending relevant channel pulses to the associated pulse highway when it is receiving the said continuous holding and engaging tone over the "holding signal" path incoming to it, and each selector-side demodulator 213 acting when it receives relevant channel pulses from the associated pulse highway 216, to apply the said continuous holding and engaging tone to the "holding signal" path 208 outgoing from it.

When a subscriber whose line is connected to a bank-side terminal trunk of the switch calls by lifting his receiver, his apparatus unit applies the holding signal condition (the said continuous holding and engaging tone) to the "holding signal" path 204 of this bank-side terminal trunk. Consequently, the particular modulator 201 concerned starts sending the relevant channel pulses to pulse highway 216, and as a result of this such channel pulses appear on a marking pulse highway 220 incoming to the master selector 215. The pulses reach the pulse highway 220 by way of an inhibiting gate circuit 222 and an isolating gate circuit 223. The function of the master selector 215, in respect of each call with which it is concerned, is to select a channel marked by the presence of the corresponding pulses on the marking pulse highway 220 and to indicate the selected channel to the sleeve selectors 214 of the switch. It will be appreciated that it may happen that a plurality of calls involving the switch are pending at the same time, and that therefore the master selector 215 has to be capable of selecting at random one of a plurality of channels marked by the presence of the corresponding pulses on the marking pulse highway 220. Assuming for simplicity of description that, when the channel pulses pertaining to the call now being considered appear on the marking pulse highway 220, the master selector 215 immediately selects the channel concerned, then this channel is indicated to all the slave selectors 214 of the switch by way of a plurality of connecting wires 221. The channel pulses which are being fed to the pulse highway 216 by the particular modulator 201 concerned, as well as appearing on the marking pulse highway 220, also reach a pulse lengthener 224 which accordingly applies a direct current signal to a trunk marker 225. In response to such a signal, the trunk marker 225 allocates and marks a free selector-side terminal trunk of the switch for use. The trunk marker 225 marks the relevant free trunk by applying a direct current signal to the demodulator 213 associated with the trunk. This signal causes the particular demodulator 213 concerned to apply the continuous holding and engaging tone to the "holding signal" path 208 outgoing from it. The signal condition on the "holding signal" path 208 is extended, by way of an isolating gate circuit 226, to a holding wire 227 of the slave selector 214 pertaining to the relevant selector-side terminal trunk. Thus, so far as this particular slave selector 214 is concerned, the combination of circumstances arises that (i) it is in its normal condition in which it is not set for furnishing channel pulses pertaining to any channel, (ii) it is receiving, over the wires 221 from the master selector 215, an indication of a particular channel, and (iii) the continuous holding and engaging tone appears on its holding wire 227. As a result of this, the slave selector now being referred to is set to the channel indicated to it by the master selector 215, and thereupon serves to furnish, on its output wire 228, channel pulses pertaining to this channel. These pulses, applied to the modulator 212 and demodulator 213 associated with the selector-side terminal trunk concerned, cause this trunk to be effectively connected, over the time division multiplex transmission system comprising pulse highways 216 and 217, to the particular bank-side terminal trunk to which the calling subscriber is connected. The pulses on the output wire 228 of the slave selector, as well as being applied to the modulator 212 and demodulator 213 with which the slave selector is associated, are also applied, by way of an isolating gate circuit 229, to the inhibiting input wire 230 of the inhibiting gate circuit 222 and of a further inhibiting gate circuit 231, with the consequence that pulses pertaining to the channel concerned no longer reach the master selector 215 or affect the trunk marker 225. The master selector 215 and trunk marker 225 accordingly become available for use in setting up another connection through the switch. The slave selector (which has been set as described) continues to furnish the channel pulses pertaining to the particular channel concerned for as long as the holding signal condition (continuous holding and engaging tone) is maintained on its holding wire 227.

When a call is to be set up to a called subscriber whose line is connected to a bank-side terminal trunk of the switch, a main marker of the exchange, which is not shown, indicates the identity of the called subscriber to a called circuit marker 232 forming part of the switch. In response to this, the called circuit marker 232 produces, on its output wire 233, pulses corresponding to the channel pulses supplied to the modulator 201 and demodulator 202 associated with the called subscriber's line. These pulses reach the marking pulse highway 220 by way of the inhibiting gate circuit 231 and an isolating gate circuit 234, and also reach a pulse lengthener 235 which accordingly applies a direct current signal condition to its output wire 236. This direct current signal condition on wire 236 causes the inhibiting gate circuit 222 to block (for the time being) the passage of any pulses from the pulse highway 216 to the marking pulse highway 220 and to the pulse lengthener 224, and thereby causes the trunk marker 225 to be in effect disabled for the time being and ensures that the master selector 215 immediately selects the channel corresponding to the pulses produced by the called circuit marker 232. This particular channel is of course the one associated with the called subscriber's line, and the master selector 215 indicates it, by way of the plurality of connecting wires 221, to all the slave selectors 214 of the switch. The direct current signal condition on the output wire 236 of the pulse lengthener 235, as well as being extended to the relevant inhibiting input wire of the inhibiting gate circuit 222, is also extended to the "backward mark signal" path 207 of each free selector-side terminal trunk of the switch. The last-mentioned extension of the direct current signal condition (which condition constitutes a backward marking signal) is by way of an inhibiting gate circuit 237 individual to each selector-side terminal trunk concerned. The inhibiting gate circuit 237 associated with a selector-side terminal trunk blocks extension of the backward marking signal as long as the holding signal condition (continuous holding and engaging tone) exists on either or both of the "holding signal" paths 208 and 210 of the trunk. In response to the extension of the backward marking signal, one of the free selector-side terminal trunks marked by such extension is taken into use (for the call concerned) at a secondary switch which is not shown, and at this secondary switch the continuous holding and engaging tone is applied to the "holding signal" path 210 of this particular trunk. This signal condition on the "holding signal" path 210 is extended, by way of an isolating gate circuit 238, to the holding wire 227 of the slave selector 214 pertaining to the relevant selector-side terminal trunk. Thus, so far as this particular slave selector 214 is concerned, the combination of circumstances arises that (i) it is in its normal condition in which it is not set for furnishing channel pulses pertaining to any channel, (ii) it is receiving, over the wires 221 from the master selector 215, an indication of a particular channel, and (iii) the continuous holding and engaging tone appears on its holding wire 227. As a result of this, the slave selector now being referred to is set to the channel indicated to it by the master selector 215, and thereupon serves to furnish, on its output wire 228, channel pulses pertaining to this channel. These pulses, applied to the modulator 212 and demodulator 213 associated with the selector-side terminal trunk concerned, cause this trunk to be effectively connected, over the time division multiplex transmission system comprising pulse highways 216 and 217, to the particular bank-side terminal trunk to which the called subscriber is connected. The pulses on the output wire 228 of the slave selector are also applied to the inhibiting input wire 230 of the inhibiting gate circuits 222 and 231, with the consequence that pulses pertaining to the channel concerned no longer reach the master selector 215. Shortly after this, the main marker of the exchange ceases to indicate the identity of the called subscriber to the called circuit marker 232, which thereupon ceases to produce, on its output wire 233, the pulses pertaining to the channel concerned. The master selector 215 accordingly becomes available for use in setting up another connection through the switch. The slave selector (which has been set as just described) continues to furnish the channel pulses pertaining to the particular channel concerned for as long as the holding signal condition (continuous holding and engaging tone) is maintained on its holding wire 227.

In applying the present invention to this type of electronic selecting switch, it may be arranged that the master selector 215 takes the form illustrated in Fig. 1 and that each slave selector 214 takes the form illustrated in Fig. 3, in which case the marking pulse highway 220 becomes the highway 11 of Fig. 1, the plurality of connecting wires 221 become the wires $SW_0$ to $SW_n$ of Figs. 1 and 3, and the wires 227 and 228 become respectively the wires 28 and 26 of Fig. 3. Alternatively, it may be arranged that the master selector 215 takes the form illustrated in Fig. 1 modified by the omission of the wire $SW_0$ and of the elements individual to this wire and that each slave selector 214 takes the form illustrated in Fig. 6, in which case the pulse generator 239 may conveniently take the form illustrated in Fig. 9, and the marking pulse highway 220 becomes the highway 11 of Fig. 1, the plurality of connecting wires 221 become the wires $SW_1$ to $SW_n$ of Figs. 1 and 6, and the wires 227 and 228 become respectively the wires 32 and 30 of Fig. 6.

We claim:

1. In a time division multiplex transmission system, control apparatus having a setting for each of a plurality of channels and serving for furnishing regularly spaced channel pulses pertaining to the channel to which it is set, an output circuit to which said control apparatus feeds said channel pulses, a group of connecting wires incoming to said control apparatus, the number of wires in said group being less than the number of channels constituting said plurality of channels, means outside said control apparatus for applying, for setting said control apparatus to a requisite channel, a marking potential to a distinctive combination of said connecting wires signifying the identity of the requisite channel, a plurality of pulse supply wires incoming to said control apparatus and consisting of one pulse supply wire corresponding to each of said connecting wires, pulse generating means outside said control apparatus for producing, as regards each pulse supply wire in said plurality of pulse supply wires, a pulse condition on the wire during, and only during, channel time periods pertaining to the particular channels signified by the particular distinctive combinations of said connecting wires that include the connecting wire to which the pulse supply wire corresponds, in said control apparatus a switching trigger circuit individual to each of said connecting wires, each said switching trigger circuit being controlled over the corresponding said connecting wire and having a stable "off" condition and a stable "on" condition and being set to its "on" condition in response to the application of said marking potential to the corresponding said connecting wire, in said control apparatus an output gate having at least one control input wire corresponding to each of said connecting wires and serving for feeding a channel pulse to said output circuit upon the coincident appearance of an input condition on all such control input wires, and in said control apparatus a switching gate corresponding to each of said connecting wires, each said switching gate being controlled by the corresponding switching trigger circuit and being connected to the corresponding one of said plurality of pulse supply wires and serving for applying said input condition to a corresponding control input wire of said output gate continuously when the corresponding switching trigger circuit is in its "off" condition and pulsatingly in correspondence with the appearances of said pulse condition on the corresponding one of said plurality of pulse supply wires when this trigger circuit is in its "on" condition.

2. In a time division multiplex transmission system, a master selector for selecting one of a plurality of channels for use, a slave selector having a setting for each of said plurality of channels and adapted to be set by said master selector and serving for furnishing regularly spaced channel pulses pertaining to the channel to which it is set, an output circuit to which said slave selector feeds said channel pulses, a group of connecting wires interconnecting said master selector and said slave selector, means in said master selector for applying, upon the selection of a channel by said master selector, a marking potential to a distinctive combination of said connecting wires signifying the identity of the selected channel in accordance with a binary code, pulse supply means for supplying pulses to said slave selector comprising a pair of pulse supply wires corresponding to each of said connecting wires and means for producing, as regards each said pair of pulse supply wires, a pulse condition on a first wire of the pair during, and only during, channel time periods pertaining to the particular channels signified by the particular distinctive combinations of said connecting wires that include the connecting wire to which the pair of pulse supply wires corresponds and a pulse condition on the second wire of the pair during, and only during, channel time periods pertaining to the remaining channels of said plurality, in said slave selector a switching trigger circuit individual to each of said connecting wires, each said switching trigger circuit being controlled over the corresponding said connecting wire and havign a stable "off" condition and a stable "on" condition and being set to its "on" condition in response to the application by said master selector of said marking potential to the corresponding said connecting wire, in said slave selector an output gate having a pair of control input wires corresponding to each of said connecting wires and serving for feeding a channel pulse to said output circuit upon the coincident appearance of an input condition on all the wires constituting these pairs of control input wires, and in said slave selector a pair of switching gates corresponding to each of said connecting wires, each said pair of switching gates being controlled by the corresponding switching trigger circuit and comprising a first switching gate corresponding to and connected to the first wire of the corresponding pair of pulse supply wires and a second switching gate corresponding to and connected to the second wire of this pair of pulse supply wires, the first switching gate of each pair serving for applying said input condition to a first wire of the corresponding pair of control input wires of said output gate continuously when the corresponding switching trigger circuit is in its "off" condition and pulsatingly in correspondence with the appearances of said pulse condition on the first wire of the corresponding pair of pulse supply wires when this trigger circuit is in its "on" condition, and the second switching gate of each pair serving for applying said input condition to the second wire of the corresponding pair of control input wires of said output gate continuously when the corresponding switching trigger circuit is in its "on" condition and pulsatingly in correspondence with the appearances of said pulse condition on the second wire of the corresponding pair of pulse supply wires when this trigger circuit is in its "off" condition.

3. In a time division multiplex transmission system, a master selector for selecting one of a plurality of channels for use, a slave selector having a setting for each of said plurality of channels and adapted to be set by said master selector and serving for furnishing regularly spaced channel pulses pertaining to the channel to which it is set, an output circuit to which said slave selector feeds said channel pulses, a group of connecting wires interconnecting said master selector and said slave selector, means in said master selector for applying upon the selection of a channel by said master selector, a marking potential to a distinctive combination of said connecting wires signifying the identity of the selected channel in accordance with a code such that each utilized distinctive combination of said connecting wires involves the same fixed number, less than the total number, of these wires, pulse supply means for supplying pulses to said slave selector comprising a pulse supply wire corresponding to each of said connecting wires and means for producing, as regards each said pulse supply wire, a pulse condition on the wire during, and only during, channel time periods pertaining to the particular channels signified by the particular distinctive combinations of said connecting wires that include the connecting wire to which the pulse supply wire corresponds, in said slave selector a switching trigger circuit individual to each of said connecting wires, each said switching trigger circuit being controlled over the corresponding said connecting wire and having a stable "off" condition and a stable "on" condition and being set to its "on" condition in response to the application by said master selector of said marking potential to the corresponding said connecting wire, in said slave selector an output gate having a control input wire corresponding to each of said connecting wires and serving for feeding a channel pulse to said output circuit upon the coincident appearance of an input condition on all these control input wires, and in said slave selector a switching gate corresponding to each of said connecting wires, each said switching gate being controlled by the corresponding switching trigger circuit and being connected to the corresponding pulse supply wire and serving for applying said input condition to the corresponding control input wire of said output gate continuously when the corresponding switching trigger circuit is in its "off" condition and pulsatingly in correspondence with the appearances of said pulse condition on the corresponding pulse supply wire when this trigger circuit is in its "on" condition.

References Cited in the file of this patent

UNITED STATES PATENTS

| | | |
|---|---|---|
| 2,490,833 | Ransom | Dec. 13, 1949 |
| 2,619,548 | Lesti | Nov. 25, 1952 |
| 2,773,934 | Trousdale et al. | Dec. 11, 1956 |